US012641374B2

(12) United States Patent
Yang et al.

(10) Patent No.: US 12,641,374 B2
(45) Date of Patent: May 26, 2026

(54) SPEAKER WITH IMPROVED BL CHARACTERISTICS AND ELECTRONIC DEVICE INCLUDING THE SAME

(71) Applicant: Samsung Electronics Co., Ltd., Suwon-si (KR)

(72) Inventors: Seongkwan Yang, Suwon-si (KR); Kiwon Kim, Suwon-si (KR); Joonrae Cho, Suwon-si (KR); Myeungseon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/783,883

(22) Filed: Jul. 25, 2024

(65) Prior Publication Data

US 2024/0381033 A1 Nov. 14, 2024

Related U.S. Application Data

(63) Continuation of application No. 17/521,191, filed on Nov. 8, 2021, now Pat. No. 12,075,228, which is a (Continued)

(30) Foreign Application Priority Data

Feb. 1, 2021 (KR) ........................ 10-2021-0013992
May 6, 2021 (KR) ........................ 10-2021-0058446

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/028* (2013.01); *H04R 7/12* (2013.01); *H04R 7/18* (2013.01);
(Continued)

(58) Field of Classification Search
CPC . H04R 9/06; H04R 1/028; H04R 7/12; H04R 7/18; H04R 9/025; H04R 9/045;
(Continued)

(56) References Cited

U.S. PATENT DOCUMENTS

| | | | | |
|---|---|---|---|---|
| 7,079,665 B2 * | 7/2006 | Shimomura | ............. | H04R 9/02 381/396 |
| 2002/0051558 A1 * | 5/2002 | Kuze | ........................ | H04R 7/20 381/415 |

(Continued)

FOREIGN PATENT DOCUMENTS

| | | |
|---|---|---|
| CN | 102308595 A | 1/2012 |
| JP | 2008-028459 A | 2/2008 |

(Continued)

OTHER PUBLICATIONS

International Search Report dated Feb. 10, 2022, issued in International Application No. PCT/KR2021/015790.

(Continued)

*Primary Examiner* — Oyesola C Ojo
(74) *Attorney, Agent, or Firm* — Jefferson IP Law, LLP

(57) ABSTRACT

A speaker and/or an electronic device are provided. The electronic device includes the same may include a diaphragm, a yoke disposed to face the diaphragm and including an avoidance groove formed on a surface thereof facing the diaphragm, a coil mounted to one surface of the diaphragm and disposed between the diaphragm and the yoke, and a first magnet mounted to the yoke and disposed to be surrounded by at least part of the coil or a second magnet disposed to surround at least part of the coil. The coil may be disposed to make a surface thereof facing the yoke correspond to the avoidance groove and configured to linearly reciprocate the diaphragm by receiving an electric signal.

13 Claims, 11 Drawing Sheets

Related U.S. Application Data continuation of application No. PCT/KR2021/015790, filed on Nov. 3, 2021.

(51) Int. Cl.

| | |
|---|---|
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............ *H04R 9/025* (2013.01); *H04R 9/045* (2013.01); *H04R 2400/11* (2013.01); *H04R 2499/11* (2013.01)

(58) Field of Classification Search

CPC .. H04R 2400/11; H04R 2499/11; H04R 7/16; H04R 9/02; H04R 9/04

See application file for complete search history.

(56) References Cited

U.S. PATENT DOCUMENTS

| | | | | |
|---|---|---|---|---|
| 2005/0271241 | A1* | 12/2005 | Watanabe | H04R 9/022 381/396 |
| 2006/0120551 | A1* | 6/2006 | Enomoto | H04R 9/025 381/396 |
| 2011/0051987 | A1 | 3/2011 | Ueda et al. | |
| 2011/0274308 | A1* | 11/2011 | Doh | H04R 9/06 381/398 |
| 2012/0177244 | A1* | 7/2012 | Liu | H04R 7/18 381/396 |
| 2016/0127834 | A1 | 5/2016 | Kim et al. | |
| 2016/0249137 | A1* | 8/2016 | Honda | H04R 7/04 |
| 2019/0069092 | A1* | 2/2019 | Yuen | H04R 7/125 |
| 2020/0077199 | A1 | 3/2020 | Wilk et al. | |
| 2020/0221214 | A1* | 7/2020 | Mordechai | H04R 7/18 |
| 2021/0044688 | A1* | 2/2021 | Rusconi Clerici Beltrami | H04R 17/00 |
| 2021/0120343 | A1* | 4/2021 | Zhang | H04R 9/02 |
| 2021/0176547 | A1* | 6/2021 | Wang | G06F 1/1688 |
| 2023/0362548 | A1* | 11/2023 | Huo | H04R 1/288 |

FOREIGN PATENT DOCUMENTS

| | | | |
|---|---|---|---|
| JP | WO2010/087007 | A | 8/2010 |
| KR | 10-2005-0113357 | A | 12/2005 |
| KR | 10-2009-0107077 | A | 10/2009 |
| KR | 10-0962594 | A | 6/2010 |
| KR | 10-2010-0138152 | A | 12/2010 |
| KR | 10-1047548 | B1 | 7/2011 |
| KR | 10-2014-0114660 | A | 9/2014 |
| KR | 10-2016-0048304 | A | 5/2016 |
| KR | 10-2016-0051193 | A | 5/2016 |
| KR | 10-1760291 | B1 | 7/2017 |
| KR | 10-1957723 | B1 | 3/2019 |
| KR | 10-1959358 | B1 | 3/2019 |

OTHER PUBLICATIONS

Extended European Search Report dated Jul. 5, 2024, issued in European Patent Application No. 21923384.8-1207.

Korean Office Action dated Jan. 26, 2026, issued in a Korean Patent Application No. 10-2021-0058446.

* cited by examiner

SPEAKER WITH IMPROVED BL CHARACTERISTICS AND ELECTRONIC DEVICE INCLUDING THE SAME

CROSS-REFERENCE TO RELATED APPLICATION(S)

This application is a continuation application of prior application Ser. No. 17/521,191, filed on Nov. 8, 2021, which is a continuation of an International application No. PCT/KR2021/015790, filed on Nov. 3, 2021, which is based on and claims the benefit of a Korean patent application number 10-2021-0013992, filed on Feb. 1, 2021, in the Korean Intellectual Property Office, and of a Korean patent application number 10-2021-0058446, filed on May 6, 2021, in the Korean Intellectual Property Office, the disclosure of each of which is incorporated by reference herein in its entirety.

TECHNICAL FIELD

The disclosure relates to an electronic device. More particularly, the disclosure relates to an electronic device including a speaker.

BACKGROUND ART

Along with the development of electronics, information, and communication technologies, various functions are being integrated in one electronic device. For example, a smart phone includes the function of an audio player, an imaging device, or an electronic notebook as well as a communication function, and more various functions may be implemented in the smart phone through installation of additional applications. The use of portable electronic devices, such as smart phones is becoming commonplace regardless of age or gender, and the integration level of electronic devices has been increasing to meet various user demands.

As electronic devices are widely used in everyday living, user demands for convenience of use and portability may further increase. For example, the convenience of use may be improved as a mechanical keypad is replaced with the touch screen function of a display. For example, since the space occupied by the mechanical keypad is replaced by the display, a larger screen may be provided in an electronic device of the same size, or the electronic device may be miniaturized by eliminating the need to install the mechanical keypad. On the other hand, as a screen provided by the display becomes larger, the use convenience may be increased. However, as the size of the display increases, the portability may become poor. The electronic device may improve or maintain the portability while providing a larger screen by a flexible display mounted in the electronic device. For example, a flexible display or an electronic device including the same may be carried in a folded or rolled state. When needed, the display may be unfolded or a view area of the display may be expanded.

The above information is presented as background information only to assist with an understanding of the disclosure. No determination has been made, and no assertion is made, as to whether any of the above might be applicable as prior art with regard to the disclosure.

DISCLOSURE

Technical Problem

To improve portability, it may be considered to reduce the thickness and/or weight of an electronic device. In designing an electronic device, for example, the length or width of the electronic device is substantially determined by the view area of a display, which may impose restrictions on miniaturization, and design freedom may be higher for the thickness and/or weight of the electronic device than for the length or width of the electronic device. However, considering that when a sufficient resonant space is secured, an acoustic component, such as a speaker may provide a good sound quality or a rich volume, the miniaturization or thinning of the electronic device may limit the sound quality or the sound volume.

Aspects of the disclosure are to address at least the above-mentioned problems and/or disadvantages and to provide at least the advantages described below. Accordingly, an aspect of the disclosure is to provide a speaker and/or an electronic device including the same, which may provide a good sound quality and/or a rich sound volume, while being miniaturized or thin.

Additional aspects will be set forth in part in the description which follows and, in part, will be apparent from the description, or may be learned by practice of the presented embodiments.

Technical Solution

In accordance with an aspect of the disclosure, a speaker and/or an electronic device is provided. The speaker and/or electronic device includes a diaphragm, a yoke disposed to face the diaphragm and including an avoidance groove formed on a surface thereof facing the diaphragm, a coil mounted to one surface of the diaphragm and disposed between the diaphragm and the yoke, and a first magnet mounted to the yoke and disposed to be surrounded by at least part of the coil or a second magnet disposed to surround at least part of the coil. The coil may be disposed to make a surface thereof facing the yoke correspond to the avoidance groove and configured to linearly reciprocate the diaphragm by receiving an electric signal.

In accordance with another aspect of the disclosure, a speaker and/or an electronic device is provided. The speaker and/or electronic device includes a diaphragm including a height adjuster protruding on one surface thereof and a bent groove sunken on the other surface thereof at a position corresponding to the height adjuster, a yoke disposed to face the diaphragm and including an avoidance groove formed on a surface thereof facing the diaphragm, a coil mounted to the height adjuster on the one surface of the diaphragm and disposed between the diaphragm and the yoke, and a first magnet mounted to the yoke and disposed to be surrounded by at least part of the coil or a second magnet disposed to surround at least part of the coil. The coil may have a smaller width on a surface thereof facing the yoke than the avoidance groove, may be disposed to make the surface thereof facing the yoke correspond to the avoidance groove, and may be configured to linearly reciprocate the diaphragm by receiving an electric signal.

In accordance with another aspect of the disclosure, a speaker and/or an electronic device is provided. The speaker and/or electronic device includes a housing including a first surface, a second surface facing in an opposite direction to the first surface, and a side surface at least partially surrounding a space between the first surface and the second surface, and at least one speaker disposed inside the housing between the first surface and the second surface. The speaker may include a diaphragm, a yoke disposed to face the diaphragm and including an avoidance groove formed on a surface thereof facing the diaphragm, a coil mounted to one surface of the diaphragm and disposed between the diaphragm and the yoke, and a first magnet mounted to the yoke and disposed to be surrounded by at least part of the coil or a second magnet disposed to surround at least part of the coil. The coil may have a smaller width on a surface thereof facing the yoke than the avoidance groove, may be disposed to make the surface thereof facing the yoke correspond to the avoidance groove, and may be configured to linearly reciprocate the diaphragm by receiving an electric signal.

Advantageous Effects

According to various embodiments of the disclosure, a speaker and/or an electronic device including the same may maximize a BL factor (or Bl(x) or a force factor) (e.g., a factor related to a magnetic flux density and the length of a coil disposed in a magnetic field) and contribute to increasing a sound volume by forming an avoidance groove and hence increasing the length of the coil or by disposing the coil at an appropriate position with respect to magnet(s) using a height adjuster. Further, the increase of the length of the coil or the arrangement of the coil at an appropriate position may improve asymmetry of BL factors and suppress even distortion of the speaker caused by the asymmetry of BL factors. For example, even though the speaker and/or the electronic device becomes smaller or thinner, it may provide a good sound quality and a rich sound volume. Therefore, the speaker and/or the electronic device including the same may be easily miniaturized, while providing a good sound quality and/or a rich sound volume. Other various effects understood directly or indirectly from the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above aspects and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
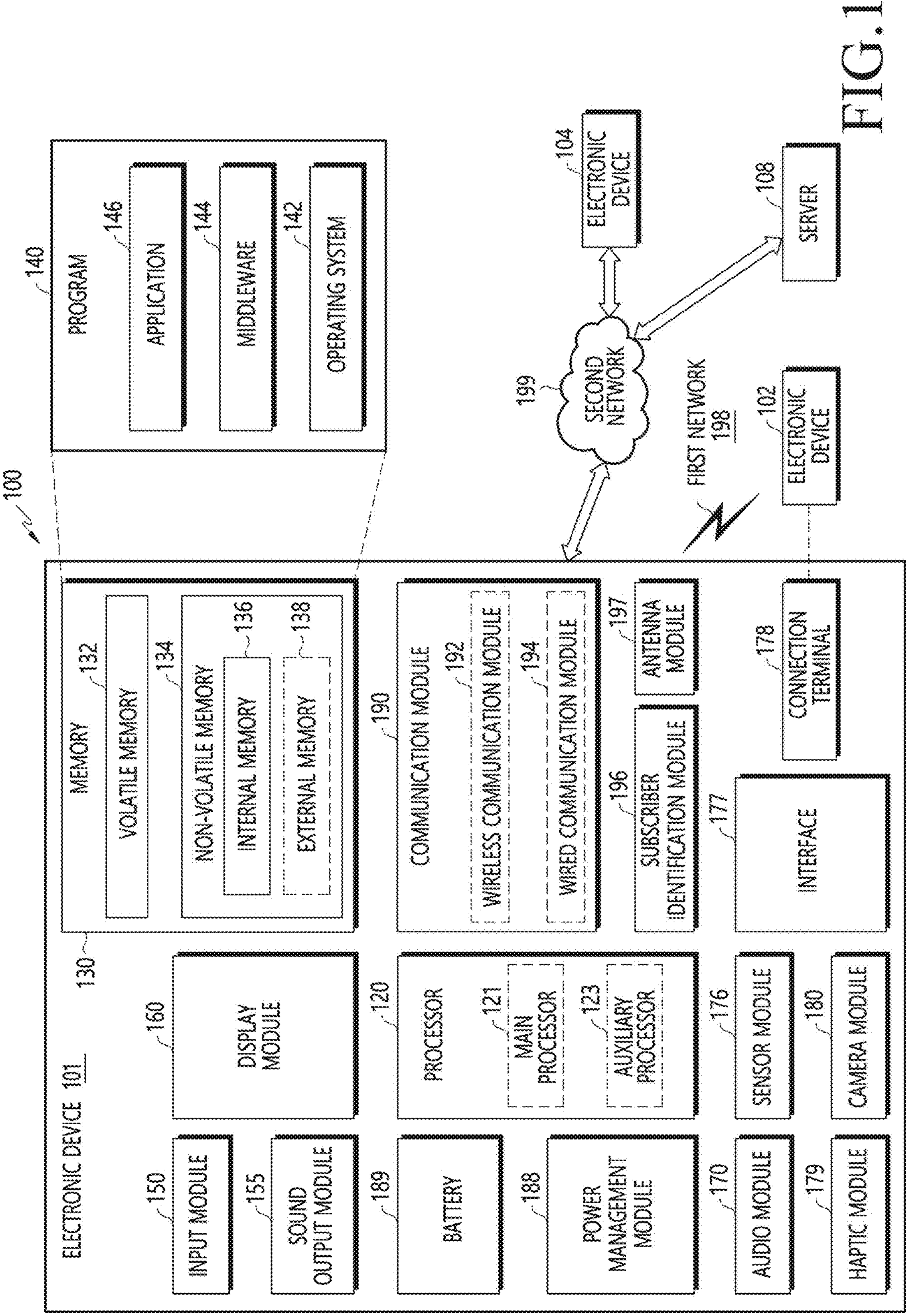
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module

170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program) including one or more instructions that are stored in a storage medium (an internal memory 136 or an external memory 138) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
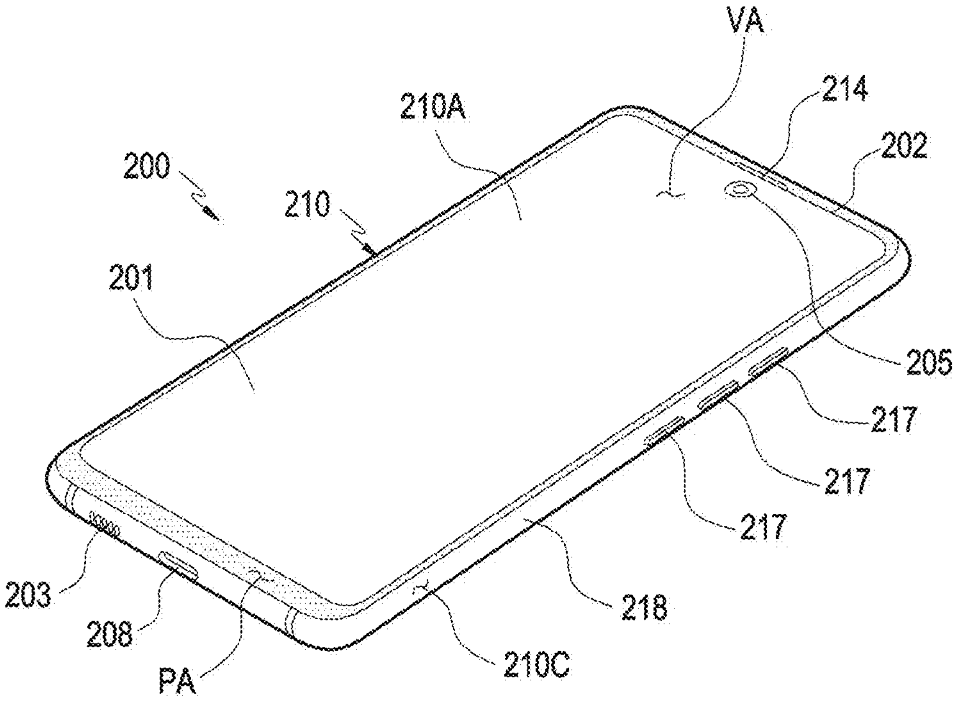
FIG. 2 is a perspective view illustrating an electronic device according to an embodiment of the disclosure.

FIG. 2 is a perspective view illustrating an electronic device 200 according to an embodiment of the disclosure.

Figure 3:
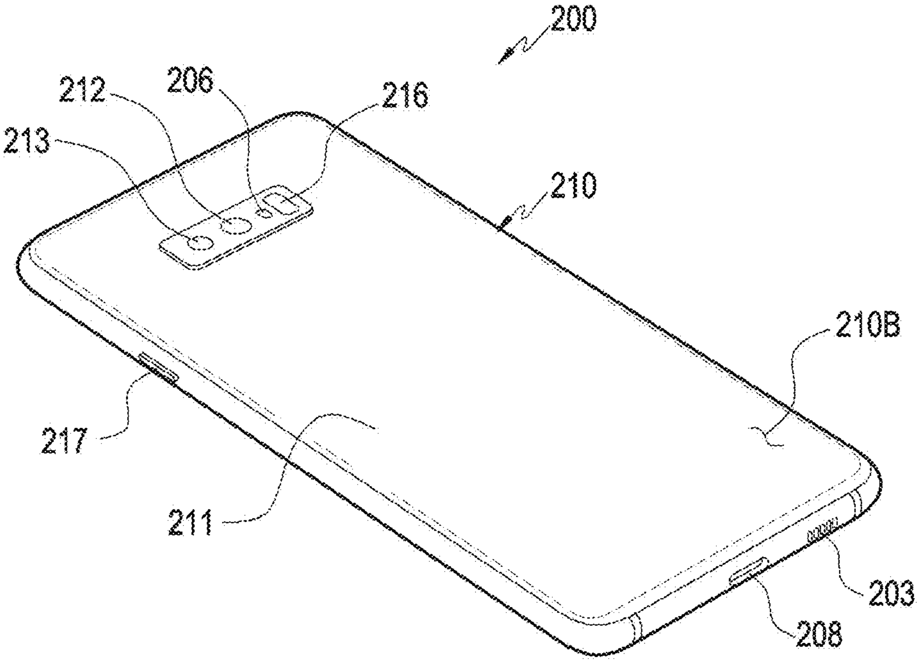
FIG. 3 is a perspective view illustrating an electronic device of FIG. 2, seen from a rear surface thereof according to an embodiment of the disclosure.

FIG. 3 is a perspective view illustrating the electronic device 200 of FIG. 2, seen from the rear surface thereof, according to an embodiment of the disclosure.

Referring to FIGS. 2 and 3, the electronic device 200 according to an embodiment may include a housing 210 which includes a first surface (or front surface) 210A, a second surface (or rear surface) 210B, and a side surface (or sidewall) 210C surrounding a space between the first surface 210A and the second surface 210B. In another embodiment (not shown), the housing 210 may refer to a structure which partially forms the first surface 210A, the second surface 210B, and the side surface 210C illustrated in FIG. 2.

According to an embodiment of the disclosure, the first surface 210A may be formed by a front plate 202 (e.g., a glass plate or polymer plate including various coating layers) which is substantially transparent at least partially. According to some embodiments of the disclosure, the front plate 202 may include a curved surface portion, at least at a side edge portion thereof, which is bent and seamlessly extends from the first surface 210A toward a rear plate 211.

According to various embodiments of the disclosure, the second surface 210B may be formed by the rear plate 211 which is substantially opaque. The rear plate 211 may be formed of, for example, coated or tinted glass, ceramic, polymer, metal (e.g., aluminum, stainless steel (STS), or magnesium), or a combination of at least two of these materials. According to some embodiments of the disclosure, the rear plate 211 may include a curved surface portion, at least at a side edge portion thereof, which is bent and seamlessly extends from the second surface 210B toward the front plate 202.

According to various embodiments of the disclosure, the side surface 210C may be coupled with the front plate 202 and the rear plate 211 and formed by a side structure (or side member or sidewall) 218 including metal and/or polymer. In some embodiments of the disclosure, the rear plate 211 and the side structure 218 may be integrally formed and include the same material (e.g., a metal material, such as aluminum).

According to an embodiment of the disclosure, the electronic device 200 may include at least one of a display 201, audio modules 203 and 214, a sensor module, an open area 205 (e.g., an optical hole 305 in FIG. 4), key input devices 217, or a connector hole 208. In an embodiment of the disclosure, the electronic device 200 may include a built-in optical module (e.g., a camera module, a light source, a proximity sensor, or an illuminance sensor) disposed in correspondence with the opening area 205. The opening area 205 may be located at a top end portion of the electronic device 200 and formed at the center of the front surface (e.g., the first surface 210A) in a width direction (e.g., an X direction in FIG. 4) or a length direction (e.g., a Y direction in FIG. 4). According to an embodiment of the disclosure, the opening area 205 may be in the form of a hole surrounded at least partially by an active area or view area VA of the display 201. In another embodiment of the disclosure, the opening area 205 may be formed within a notch area formed within the active area VA. For example, the opening area 205 may be defined as a part of the notch area or may be formed into a hole surrounded by the notch area. In another embodiment of the disclosure, the optical module may be disposed under the display 201 and receive light transmitted through part of the active area VA of the display 201 or emit light to the outside of the electronic device 200. In this case, the opening area 205 (e.g., the optical hole 305 in FIG. 4) may be omitted or may be substantially part of the active area VA of the display 201. In some embodiments of the disclosure, at least one (e.g., a key input device 217) of the components may be omitted from the electronic device 200, or other components may be added in the electronic device 200. For example, the electronic device 200 may include the sensor module (not shown). For example, a sensor, such as a proximity sensor or an illuminance sensor may be incorporated in or disposed adjacent to the display 201 in an area provided by the front plate 202. In some embodiments of the disclosure, the electronic device 200 may further include a light emitting device, and the light emitting device may be disposed adjacent to the display 201 in the area provided by the front plate 202. For example, the light emitting device may provide state information about the electronic device 200 by light. In another embodiment of the disclosure, the light emitting device may, for example, provide a light source operating in conjunction with an operation of the optical module (e.g., the camera module) disposed in the opening area 205. The light emitting device may include, for example, a light emitting diode (LED), an IR LED, and a xenon lamp.

The display 201 may be visually exposed, for example, through a substantial portion of the front plate 202. In some embodiments of the disclosure, the corners of the display 201 may be formed in the same shapes as those of adjacent peripheral portions of the front plate 202 on the whole. In another embodiment (not shown), the gap between the periphery of the display 201 and the periphery of the front plate 202 may be equal on the whole to increase the exposed area of the display 201. For example, when seen from above the front plate 202, the display area VA of the display 201 and a peripheral area PA (e.g., a black matrix area) formed around the display area VA may form substantially the front surface (e.g., the first surface 210A) of the electronic device 200, and the view area VA may occupy 90% or more, substantially 100% of the area of the first surface 210A. In another embodiment (not shown) of the disclosure, a recess or opening (e.g., the opening area 205) may be formed in part of the display area VA, and other electronic components, for example, the camera module, the proximity sensor, or the illuminance sensor (not shown) may be aligned with the recess or opening (e.g., the opening area 205). In another embodiment of the disclosure, other electronic components aligned with the recess or opening may include at least one of an IR projector, an iris sensor, a gesture sensor, an IR sensor, a temperature sensor, a humidity sensor, or a barometric pressure sensor.

In another embodiment (not shown) of the disclosure, the electronic device 200 may include at least one of camera modules 212 and 213, a fingerprint sensor 216, or a flash 206, which is disposed to face in an opposite direction to the view area VA of the display 201. In another embodiment (not shown), the display 201 may be incorporated with or disposed adjacent to a touch sensing circuit, a pressure sensor that measures the intensity (pressure) of a touch, and/or a digitizer that detects a magnetic field-based stylus pen.

The audio modules 203 and 214 may include a microphone hole and a speaker hole. A microphone for obtaining an external sound may be disposed in the microphone hole, and in some embodiments of the disclosure, a plurality of microphones may be disposed to detect the direction of a sound. In some embodiments of the disclosure, the speaker hole and the microphone hole may be implemented as a single hole (e.g., a hole in the audio module denoted by reference numeral '203'), or a speaker (e.g., a piezo speaker) may be included without the speaker hole. The speaker hole may include an external speaker hole and a receiver hole for calls (e.g., a hole in the audio module denoted by reference numeral '214').

As the electronic device 200 includes the sensor module (not shown), the sensor module may generate an electrical signal or data value corresponding to an internal operation state or external environmental state of the electronic device 200. The sensor module may further include, for example, a proximity sensor disposed on the first surface 210A of the housing 210, a fingerprint sensor incorporated in or disposed adjacent to the display 201, and/or a biometric sensor (e.g., a heart rate monitor (HRM) sensor) disposed on the second surface 210B of the housing 210. The electronic device 200 may further include a sensor module (not shown), for example, at least one of a gesture sensor, a gyro sensor, a barometric pressure sensor, a magnetic sensor, an acceleration sensor, a grip sensor, a color sensor, an IR sensor, a biosensor, a temperature sensor, a humidity sensor, or an illuminance sensor.

The camera modules 212 and 213 may include a first camera module (e.g., a camera module disposed in correspondence with the opening area 205) disposed on the first surface 210A of the electronic device 200, and second camera modules 212 and 213 and/or the flash 206 disposed on the second surface 210B of the electronic device 200. The camera modules 212 and 213 may include one or more lenses, an image sensor, and/or an image signal processor. The flash 206 may include, for example, an LED or a xenon lamp. In some embodiments of the disclosure, three or more lenses (an IR camera, a wide-angle lens, and a telephoto lens) and image sensors may be arranged on one surface of the electronic device 200.

The key input devices 217 may be arranged on the side surface 210C of the housing 210. In another embodiment of the disclosure, the electronic device 200 may not include some or any of the above key input devices 217, and the key input devices 217 which are not included may be implemented in other forms, such as soft keys on the display 220. In some embodiments of the disclosure, a key input device may include at least part of the fingerprint sensor 216 disposed on the second surface 210B of the housing 210.

The connector hole 208 may accommodate a connector for transmitting and receiving power and/or data to and from an external electronic device, and a connector for transmitting/receiving an audio signal to and from an external electronic device. For example, the connector hole 208 may include a USB connector or an earphone jack.

Figure 4:
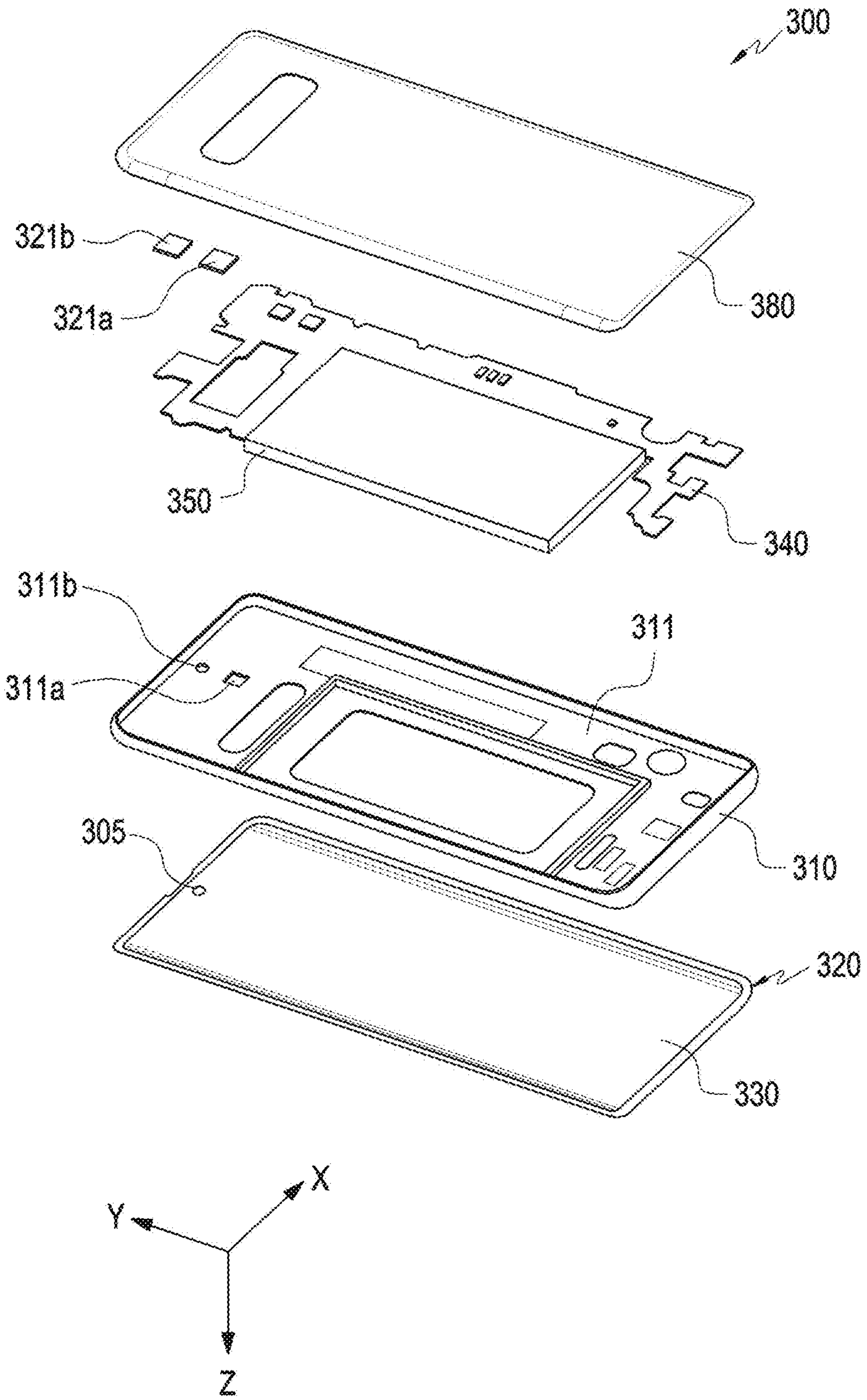
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 300 may include a side structure 310 (e.g., the side structure 218 in FIG. 2), a middle plate, for example, a support member 311 (e.g., a bracket), a front plate 320 (e.g., the front plate 202 in FIG. 2), a display 330 (e.g., the display 201 in FIG. 2), a printed circuit board 340, a battery 350, and a rear plate 380 (e.g., the rear plate 211 in FIG. 3). According to one embodiment of the disclosure, the display 330 may be disposed between the front plate 320 and the rear plate 380, and the printed circuit board 340 may be disposed behind the display 330 (e.g., between the display 330 and the rear plate 380) in a thickness direction Z of the electronic device 300. In an embodiment of the disclosure, the support member 311 may be disposed between the display 330 and the printed circuit board 340 to provide an electromagnetic isolation structure between the display 330 and the printed circuit board 340. In some embodiments of the disclosure, the electronic device 300 may dispense with at least one (e.g., the support member 311) of the components or may further include other components. At least one of the components of the electronic device 300 may be the same as or similar to at least one of the components of the electronic device 200 in FIG. 2 or FIG. 3, and a redundant description will be avoided herein.

In an embodiment of the disclosure, when seen from above the front plate 320, an opening area or the optical hole 305 (e.g., opening area 205 in FIG. 2) formed on the display 330 may be located at a top end portion of the electronic device 300, and may be formed, for example, at the center in a width direction X of the electronic device 300. In various embodiments of the disclosure, the term "opening area" may refer to an area formed by a hole formed in a view area VA, penetrating through the display 330 (e.g., the display 201 in FIG. 2). In some embodiments of the disclosure, the term "opening area" may refer to a transparent area without any pixels, which is surrounded by the view area VA. For example, the opening area or the optical hole 305 may provide a path through which light is incident inward from the outside of the front plate 320. In another embodiment of the disclosure, the opening area or the optical hole 305 may provide a path through which light is emitted from the inside of the front plate 320 to the outside. In another embodiment of the disclosure, the "opening area (e.g., the opening area 205 or the optical hole 305 in FIG. 2 or FIG. 4)" may have a structure that transmits light but separates the internal space and external space of the electronic device 200 or 300. In another embodiment of the disclosure, the "opening area" may be in the form of a physical or mechanical hole that connects the internal and external spaces of the electronic device 200 or 300 while transmitting light. For example, when the electronic device 200 or 300 includes a temperature sensor or a humidity sensor, information about an ambient environment of the electronic device 200 or 300 may be detected through the opening area 205 or the optical hole 305. According to some embodiments of the disclosure, the opening area 205 or the optical hole 305 may not be visually exposed, and a camera module (not shown) may be disposed under the view area and thus hidden. For example, the electronic device 200 or 300 may include an under display camera (UDC) that captures an object through the display 330 while being concealed by the display 330. In the structure including the UDC, the arrangement density of pixels may be less in an area corresponding to the UDC than in the other areas.

The support member 311 may be disposed inside the electronic device 300 and coupled to the side structure 310, or may be integrally formed with the side structure 310. The support member 311 may be formed of, for example, a metal material and/or a non-metal (e.g., polymer) material. The support member 311 may be coupled with the display 330 on one surface thereof and with the printed circuit board 340 on the other surface thereof. A processor, a memory, and/or an interface (e.g., the processor 120, the memory 130, and/or the interface 177 in FIG. 1) may be mounted on the printed circuit board 340. The processor may include, for example, at least one of a central processing unit, an application processor, a graphics processing unit, an image signal processor, a sensor hub processor, or a communication processor.

The memory may include, for example, a volatile memory or a non-volatile memory.

The interface may include, for example, a high-definition multimedia interface (HDMI), a USB interface, a secure digital (SD) card interface, and/or an audio interface. The interface may, for example, electrically or physically couple the electronic device 300 to an external electronic device, and may include a USB connector, an SD card/multimedia card (MMC) connector, or an audio connector.

The battery 350 is a device for supplying power to at least one component of the electronic device 300 and may include, for example, a non-rechargeable primary battery, a rechargeable secondary battery, or a fuel cell. At least part of the battery 350 may be disposed on the same plane as, for example, the printed circuit board 340. The battery 350 may be integrally disposed inside the electronic device 300, or may be disposed detachably from the electronic device 300.

According to an embodiment of the disclosure, the electronic device 300 may include a speaker 321*a* coupled to a receiver (e.g., the hole in the audio module denoted by reference numeral '214' in FIG. 2), and an electronic component 321*b* disposed in correspondence with the opening area or optical hole 305 (e.g., the opening area 205 in FIG. 2). For example, the speaker 321*a* may be disposed inside the electronic device 300 (e.g., the housing 210 in FIG. 2) and output sounds (e.g., voice or sounds of a received call) to the outside of the electronic device 300 through the receiver.

According to an embodiment of the disclosure, the electronic component 321*b* accommodated in the housing 210 may emit an optical signal (e.g., IR light) through the opening area or optical hole 305 or may receive or obtain an external optical signal. For example, the electronic component 321*b* disposed in correspondence with the opening area or optical hole 305 may include at least one of an IR projector, a gesture sensor, a proximity sensor, an illuminance sensor, a camera, an IR sensor, or a face or iris sensor. In some embodiments of the disclosure, the electronic component 321*b* disposed in correspondence with the opening area or optical hole 305 may include at least one of a temperature sensor, a humidity sensor, or a barometric pressure sensor. When the electronic component 321*b* includes at least one of a temperature sensor, a humidity sensor, or a barometric pressure sensor, the opening area or optical hole 305 may have a through-hole structure, and the electronic component 321*b* may detect an environment (e.g., temperature, humidity, or atmospheric pressure) outside the electronic device 300, using air as a medium.

The electronic device 300 may further include a plurality of through holes 311*a* and 311*b* formed on the support member 311. Among the through holes, a first through hole 311*a* may be formed in correspondence with the speaker 321*a*. For example, the speaker 321*a* may be disposed closer to the rear of the electronic device 300 than the support member 311 (e.g., disposed between the support member 311 and the rear plate 380) and radiate sounds forward from the support member 311 through the first through hole 311*a*. Among the through holes, a second through hole 311*b* may be formed in correspondence with the electronic component 321*b*. For example, the electronic component 321*b* may be disposed closer to the electronic device 300 than the support member 311, between a sound hole (e.g., a hole formed by the side structure 310 and the front plate 320 in FIG. 4, which is the speaker hole corresponding to the audio module 214 in FIG. 2) and the speaker 321*a* (e.g., disposed between the support member 311 and the rear plate 380), and may radiate an optical signal forward from the support member 311 through the second through hole 311*b* or receive or obtain various pieces of information about an external environment from before the support member 311.

The following description will be given of various embodiments of the disclosure with the appreciation that the same reference numerals are given to or no reference numerals are given to components which are readily understood from the electronic devices 200 and 300 described above in the drawings, and a detailed description of the components may be avoided. In the following description of embodiments of the disclosure, reference may be made to the drawings or components of the foregoing embodiments of the disclosure, for conciseness of the drawings or detailed description.

Figure 5:
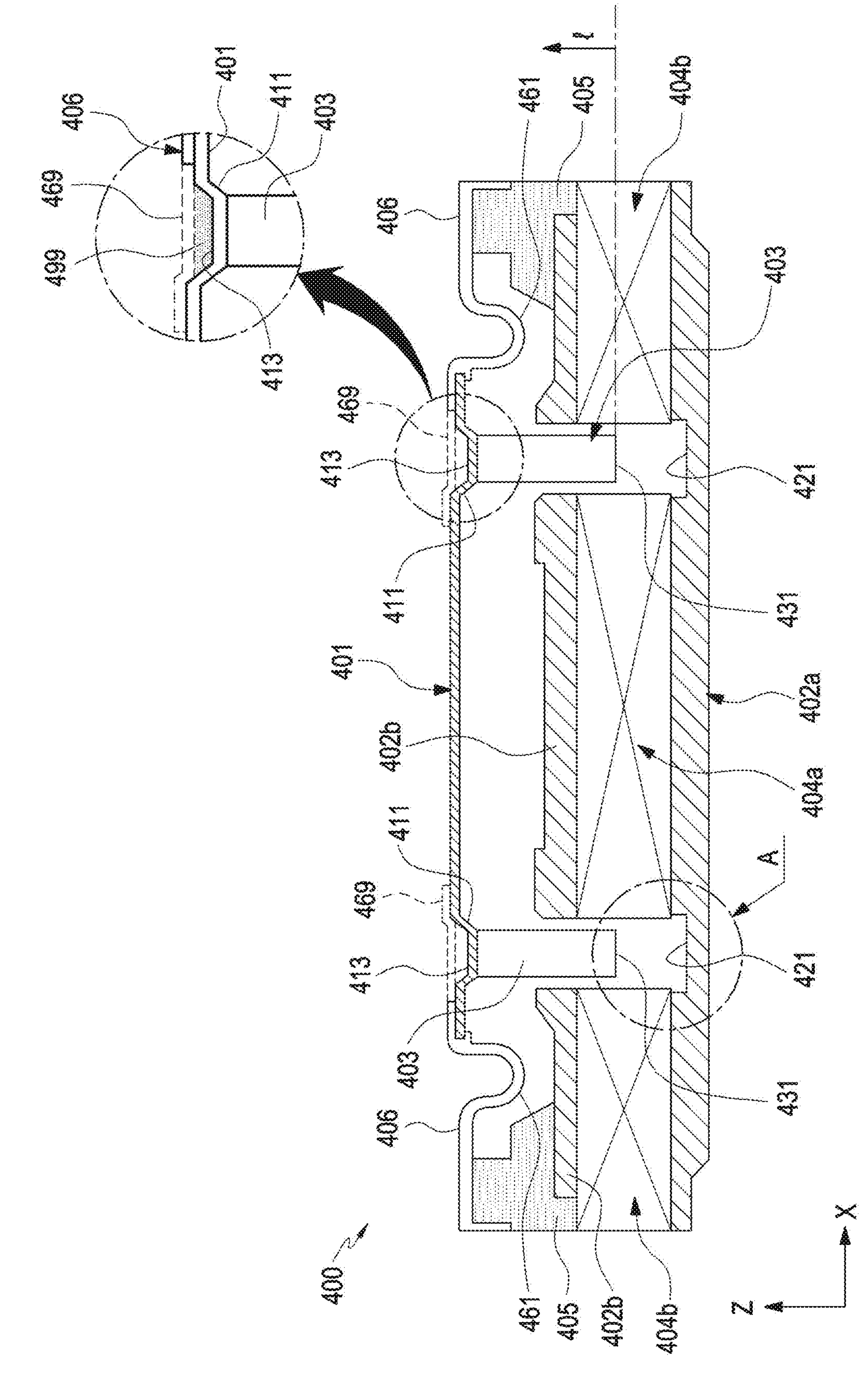
FIG. 5 is a sectional view illustrating a configuration of a speaker in an electronic device according to an embodiment of the disclosure.
Figure 6:
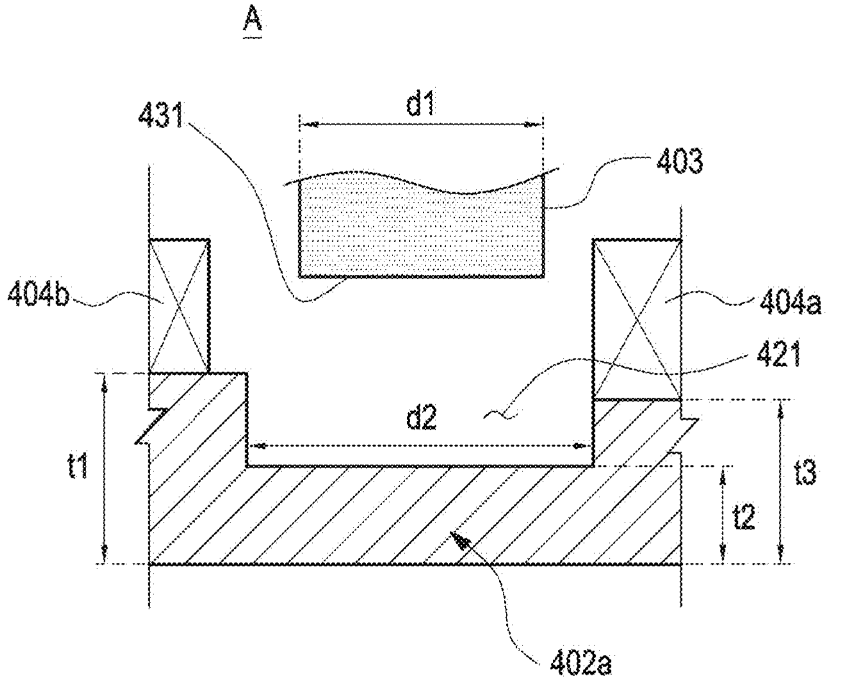
FIG. 6 is an enlarged view illustrating part 'A' in FIG. 5 according to an embodiment of the disclosure.
Figure 7:
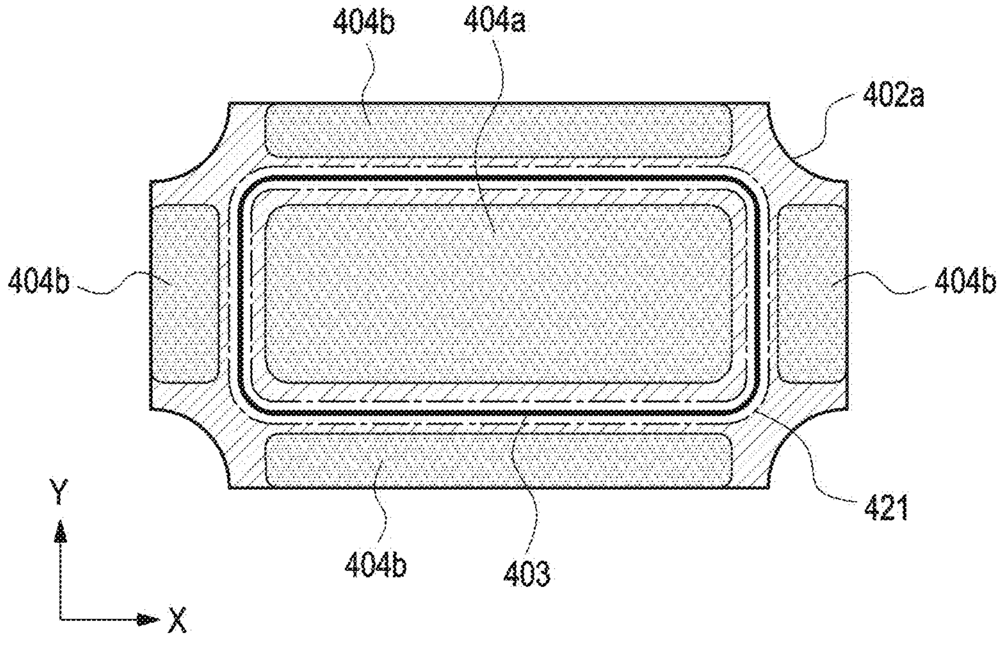
FIG. 7 is a plan view illustrating magnet(s) and/or a coil in a speaker of an electronic device according to an embodiment of the disclosure.

FIG. 5 is a sectional view illustrating a configuration of a speaker 400 (e.g., the sound output module 155 in FIG. 1 or the speaker 321*a* in FIG. 4) of an electronic device (e.g., the electronic devices 101, 102, 104, 200, and 300 in FIGS. 1 to 4) according to an embodiment of the disclosure. FIG. 6 is an enlarged view illustrating part 'A' in FIG. 5 according to an embodiment of the disclosure. FIG. 7 is a plan view illustrating arrangement of magnet(s) 404*a* and 404*b* and/or a coil 403 in the speaker 400 of the electronic device 300 according to an embodiment of the disclosure.

Referring to FIGS. 5 to 7, the speaker 400 (e.g., the speaker 321*a* in FIG. 4) may include a diaphragm 401, a yoke (e.g., a first yoke 402*a*), the coil 403, and/or at least one magnet 404*a* and 404*b*, and the coil 403 may be disposed on one surface of the diaphragm 401, in correspondence with an avoidance groove 421 formed on the first yoke 402*a*. The coil 403 may be disposed in a magnetic field provided by the magnet(s) 404*a* and 404*b* and may generate an electric field by receiving an electric signal. For example, interaction between the magnetic field and the electric field may cause the coil 403 to move relative to the magnet(s) 404*a* and 404*b*, so that the coil 403 may linearly reciprocate the diaphragm 401 over the first yoke 402*a* and/or the magnet(s) 404*a* and 404*b*.

According to various embodiments of the disclosure, the speaker 400 may further include a frame 405 or a suspension 406 that couples the diaphragm 401 to the yoke 402*a* and/or the magnet(s) 404*a* and 404*b*, and the diaphragm 401 may linearly reciprocate by an electromagnetic force from the magnet(s) 404*a* and 404*b* and the coil 403 and an elastic force from the suspension 406. In another embodiment of the disclosure, the suspension 406 may be directly coupled to the diaphragm 401, whereas the frame 405 may not be directly coupled to the magnet(s) 404*a* and 404*b* or the first yoke 402*a*. For example, the speaker 400 may further include an additional structure (not shown) coupling the frame 405 to the magnet(s) 404*a* and 404*b* or the first yoke 402*a*.

According to various embodiments of the disclosure, as the suspension 406 has an elastic force, the suspension 406 may support the linear reciprocating motion of the diaphragm 401. In some embodiments of the disclosure, when the diaphragm 401 linearly reciprocates, the suspension 406 may accumulate or provide an elastic force that moves the diaphragm 401 to an initial assembled position. In an embodiment of the disclosure, the suspension 406 may include a bent portion 461 that protrudes toward the first yoke 402*a* and/or the magnet(s) 404*a* and 404*b*. The suspension 406 may be formed by processing a flat plate made of a metal or polymer material. As the suspension 406 includes the bent portion 461 protruding at a part thereof, the suspension 406 may have a higher modulus of elasticity. In an embodiment of the disclosure, the frame 405 may be coupled with an edge of the suspension 406 and mounted to any other structure, for example, one of a yoke (e.g., a second yoke 402*b*) and the magnet(s) 404*a* and 404*b*. For example, the frame 405 and/or the suspension 406 may support the diaphragm 401, so that the diaphragm 401 may linearly reciprocate, facing the yoke (e.g., the first yoke 402*a*).

According to various embodiments of the disclosure, the diaphragm 401 and the first yoke 402*a* may be disposed to at least partially face each other, and the diaphragm 401 may linearly reciprocate toward or away from the first yoke 402*a* (e.g., in a Z-axis direction). The first yoke 402*a* may include the avoidance groove 421 formed on a surface thereof facing the diaphragm 401, and the thickness t2 of the first yoke 402*a* at a position where the avoidance groove 421 is formed may be smaller than the thicknesses t1 and t3 of the first yoke 402*a* at positions where the avoidance groove 421 is not formed. In some embodiments of the disclosure, the first yoke 402*a* may partially have the different thicknesses t1 and t3 even at the positions where the avoidance groove 421 is not formed. According to an embodiment of the disclosure, the magnet(s) 404*a* and 404*b* may be disposed on one surface of the first yoke 402*a* and thus located substantially between the diaphragm 401 and the first yoke 402*a*, and the first yoke 402*a* may align the direction or distribution of the magnetic field generated by the magnet(s) 404*a* and 404*b*. In some embodiments of the disclosure, the speaker 400 may further include the second yoke(s) 402*b* disposed between the diaphragm 401 and the magnet(s) 404*a* and 404*b*. The second yoke(s) 402*b* may be disposed substantially on the surface of the magnets 404*a* and 404*b*, and may align the direction or distribution of the magnetic field generated by the magnet(s) 404*a* and 404*b*, together with the first yoke 402*a*.

According to various embodiments of the disclosure, the coil 403 may be mounted on one surface of the diaphragm 401 to be located substantially between the diaphragm 401 and the first yoke 402*a*. In some embodiments of the disclosure, among the magnets, a first magnet 404*a* may be disposed to be surrounded by at least part of the coil 403. In another embodiment of the disclosure, among the magnets, second magnet(s) 404*b* may be disposed to surround at least part of the coil 403. In the illustrated embodiment of the disclosure, when seen to the Z-axis direction, one first magnet 404*a* is disposed to be surrounded by the coil 403, and a plurality of (e.g., four) second magnets 404*b* are arranged around the coil 403, by way of example. The shapes, numbers, and/or arrangement of the magnets 404*a* and 404*b* may vary according to specifications required for the speaker 400 to be actually manufactured and/or the electronic device 300 including the same.

According to various embodiments of the disclosure, a surface 431 of the coil 403 facing the first yoke 402*a* may be disposed to correspond to the avoidance groove 421, and a first width d1 of the coil 403 measured in the X-axis direction (or Y-axis direction) (e.g., the width of the surface 431 facing the first yoke 402*a*) may be smaller than a second width d2 of the avoidance groove 421. For example, the coil 403 may have a size and shape enough to be partially accommodated in the avoidance groove 421. Considering a range in which the coil 403 and/or the diaphragm 401 linearly reciprocates, a specified distance may be ensured between the coil 403 and the first yoke 402*a* (e.g., the bottom surface of the avoidance groove 421). For example, when the speaker 400 outputs a sound, a sufficient gap may be ensured between the coil 403 and the first yoke 402*a* (e.g., the bottom of the avoidance groove 421), so that the coil 403 does not come into direct contact with the first yoke 402*a*.

According to various embodiments of the disclosure, as the speaker 400 becomes smaller or thinner, it may be difficult to secure a gap between the coil 403 and the first yoke 402*a*. The speaker 400 according to various embodiments of the disclosure may include the avoidance groove 421 formed on the first yoke 402*a* to thereby secure a gap between the coil 403 and the first yoke 402*a*. In an embodiment of the disclosure, compared to a speaker of the same thickness without the avoidance groove 421, the speaker 400 according to various embodiments of the disclosure may have a greater amplitude of the coil 403 or the diaphragm 401. In another embodiment of the disclosure, for the same amplitude of the coil 403 or the diaphragm 401, compared to a speaker having the same gap between the first yoke 402*a* and the coil 403 without the avoidance groove 421, the thickness of the speaker 400 according to various embodiments of the disclosure may be reduced by as much as the depth of the avoidance groove 421. For example, sounds may be tuned more easily and/or the thickness of the speaker 400 may be reduced by as much as the depth of the avoidance groove 421, by further securing the amplitude of the coil 403 or the diaphragm 401 using the avoidance groove 421.

According to various embodiments of the disclosure, compared to a speaker without the avoidance groove 421, the coil 403 may be displaced in a −Z-axis direction by as much as the depth of the avoidance groove 421, with the same gap between the first yoke 402*a* and the coil 403. For example, the thickness of the speaker 400 may be reduced by as much as the −Z-axis direction displacement of the coil 403. In some embodiments of the disclosure, as the coil 403 moves further in the −Z-axis direction while the positions of the first yoke 402*a* and the magnets 404*a* and 404*b* are maintained, a larger portion of the coil 403 may be located in the magnet field generated by the magnets 404*a* and 404*b*. For example, the coil 403 may stably operate (e.g., output sounds) in alignment with the magnets 404*a* and 404*b* at an appropriate position.

According to various embodiments of the disclosure, as the magnets 404*a* and 404*b* are disposed on a yoke (e.g., the first yoke 402*a*), and the coil 403 is disposed on the diaphragm 401, there may be a Z-axis direction deviation between the positions of the magnets 404*a* and 404*b* and the position of the coil 403. For example, the center of the magnets 404*a* and 404*b* and the center of the coil 403 may be misaligned in the Z-axis direction in a simple assembly state (hereinafter, referred to as an initial position). A BL factor or vibration force generated by an electromagnetic force (e.g., a vibration force generated by interaction between the magnets 404*a* and 404*b* and the coil 403)) may be maximized at a position where the center of the magnets 404*a* and 404*b* and the center of the coil 403 coincide in the Z-axis direction, and when a BL factor based on a +Z direction displacement and a BL factor based on a −Z direction displacement are symmetrical with respect to a point where the BL factor is maximized, good sound quality may be easily achieved. In some embodiments of the disclosure, the ‘BL factor (or force factor)’ may be defined by an integral of a magnetic flux density and the length of a coil located in a magnetic field according to vibration of the diaphragm 401. A ‘+Z/−Z direction displacement’ may mean a distance that the coil 403 and/or the diaphragm 401 has moved in the Z-axis direction from the initial position. The asymmetry or non-linearity of the BL factor or vibration force may be proportional to the positional deviation between the magnets 404*a* and 404*b* and the coil 403 in the Z-axis direction, and as the speaker 400 and/or the electronic device 300 including the same according to various embodiments of the disclosure include the avoidance groove 421, the positional deviation between the magnets 404*a* and 404*b* and the coil 403 in the Z-axis direction may be reduced, and the asymmetry or non-linearity of the BL factor or vibration force may be improved. the positional deviation between the magnets 404*a* and 404*b* and the coil 403 in the Z-axis direction or the asymmetry or non-linearity of the BL factor caused by the positional deviation will be further described with reference to FIGS. 8 and 9.

According to various embodiments of the disclosure, the suspension 406 may be deformed by the vibration of the diaphragm 401, for example, the linear reciprocating motion of the diaphragm 401. For example, the bent portion 461 may move away from or toward the yokes 402*a* and 402*b* or the magnets 404*a* and 404*b* according to the linear reciprocating motion of the diaphragm 401. Similarly to securing a specified gap between the coil 403 and a yoke (e.g., the first yoke 402*a*), another specified gap may be secured between the suspension 406 (e.g., the bent portion 461) and another structure (e.g., the second magnet(s) 404*b* or the second yoke 402*b*). The gap between the suspension 406 and the structure may substantially limit the gap between the first yoke 402*a* and the diaphragm 401 or act as an obstacle to reduction of the positional deviation between the magnets 404*a*, 404*b* and the coil 4 in the Z-axis direction. According to various embodiments of the disclosure, the speaker 400 (e.g., the diaphragm 401) may further include a height adjuster 411 to reduce the positional deviation between the magnets 404*a* and 404*b* and the coil 403 in the Z-axis direction.

According to various embodiments of the disclosure, the diaphragm 401 may be shaped into a partially bent flat plate. For example, the diaphragm 401 may include the height adjuster 411 protruding from one surface thereof. In an embodiment of the disclosure, the height adjuster 411 may be shaped into a closed curve extending along an edge of one surface of the diaphragm 401, and the coil 403 may be substantially mounted on the height adjuster 411. In some embodiments of the disclosure, when the diaphragm 401 is in the shape of a bent flat plate, the other surface of the diaphragm 401 may include a bent groove 413 formed at a position corresponding to the height adjuster 411. For example, the height adjuster 411 may protrude from one surface of the diaphragm 401 in the −Z direction in correspondence with a depth to which the bent groove 413 is recessed on the other surface of the diaphragm 401. In some embodiments of the disclosure, a height to which the height adjuster 411 protrudes may be substantially equal to, for example, the depth (e.g., t1-t2 or t3-t2) of the avoidance groove 421.

According to various embodiments of the disclosure, since the coil 403 is disposed on the height adjuster 411, a positional deviation with respect to the magnets 404*a* and 404*b* in the Z-axis direction may be improved. For example, with a gap secured between the suspension 406 (e.g., the bent portion 461) and another structure (e.g., the second magnets 404*b* or the second yoke 402*b*), the coil 403 may be aligned at a suitable position with respect to the magnets 404*a* and 404*b*. A ‘suitable position at which the coil 403 is disposed’ may mean a position at which the center of the magnets 404*a* and 404*b* coincides with the center of the coil 403 in the Z-axis direction. In another embodiment of the disclosure, considering the arrangement structure of the yokes 402*a* and 402*b*, the magnets 404*a* and 404*b*, the diaphragm 401, and/or the coil 403, and the amplitude of the diaphragm 401 and/or the coil 403, it may be practically impossible to arrange the center of the magnets 404*a* and 404*b* and the center of the coil 403 at the same position in the Z-axis direction in the speaker 400 that is actually manufactured. For example, a ‘suitable position at which the coil 403 is disposed’ may refer to a position at which the positional deviation between the center of the magnets 404*a* and 404*b* and the center of the coil 403 in the Z-axis direction may be reduced by using the avoidance groove 421 and/or the height adjuster 411. In another embodiment of the disclosure, ‘the center of the magnets 404*a* and 404*b* and the center of the coil 403’ may refer to not the center of the magnets 404*a* and 404*b* and the center of the coil 403 in terms of shape but the center of a magnetic and/or electric field distribution.

According to various embodiments of the disclosure, the speaker 400 may further include a filler 499 disposed in the bent groove 413. The filler 499 may include, for example, an adhesive and serve as a stiffener to maintain or improve the rigidity of the diaphragm 401. The filler 499 may be useful to avoid a break-up mode that may occur in the diaphragm 401 of the speaker 400. According to an embodiment of the disclosure, the suspension 406 may be coupled with at least part of an edge of the diaphragm 401. For example, an inner edge of the suspension 406 (e.g., a part denoted by reference numeral ‘469’ in FIG. 5) may be bonded to the other surface of the diaphragm 401 (e.g., the surface on which the bent groove 413 is formed), and according to some embodiments of the disclosure, disposed to cover at least part of the bent groove 413. In another embodiment of the disclosure, with the filler 499 disposed in the bent groove 413, the suspension 406 may seal the bent groove 413. In the structure in which the suspension 406 seals the bent groove 413, the filler 499 may function as an adhesive for maintaining the bonding state between the suspension 406 and the diaphragm 401.

Figure 8:
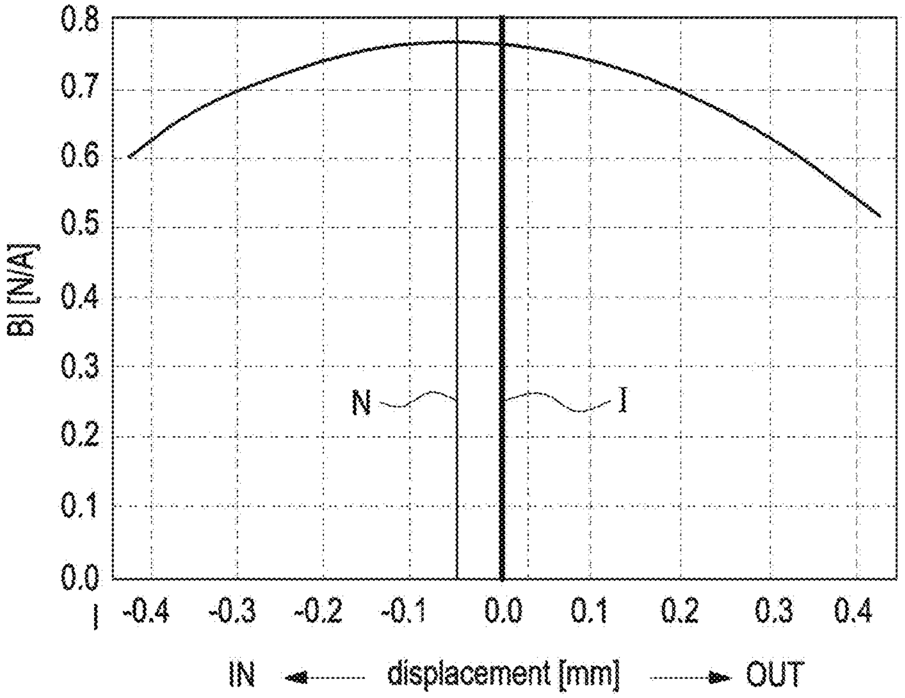
FIG. 8 is a graph illustrating measured BL factors versus coil displacements in a general speaker according to an embodiment of the disclosure.
Figure 9:
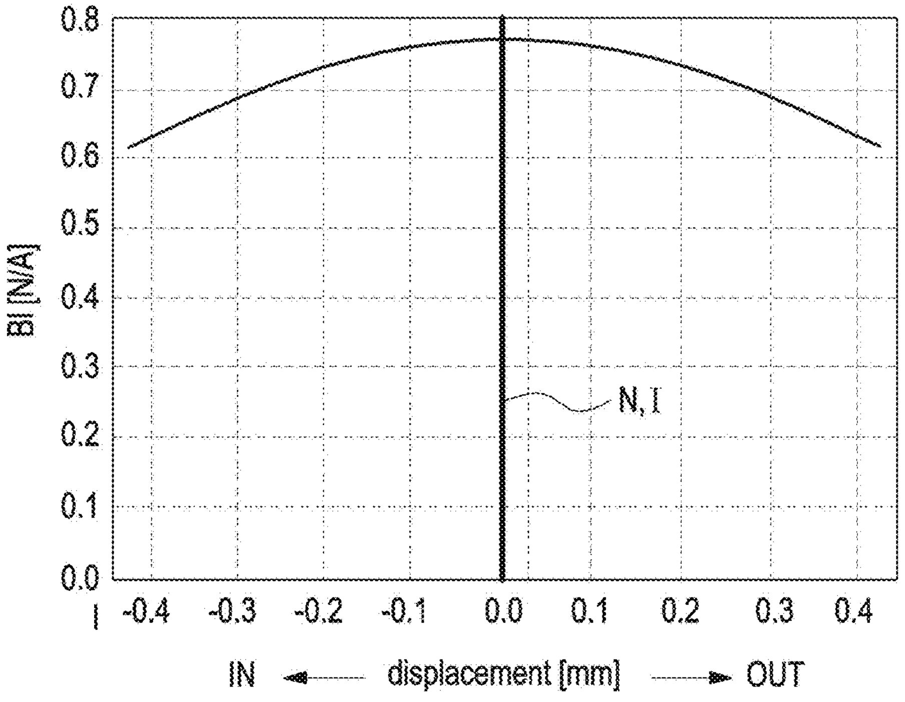
FIG. 9 is a graph illustrating measured BL factors versus coil displacements in a speaker of an electronic device according to an embodiment of the disclosure.

FIG. 8 is a graph illustrating measured BL factors versus coil displacements in a general speaker according to an embodiment of the disclosure. FIG. 9 is a graph illustrating measured BL factors versus displacement of a coil (e.g., the coil 403 in FIG. 5) in a speaker (e.g., the speaker 321*a* or 400 in FIG. 4 or FIG. 5) of an electronic device (e.g., the electronic devices 101, 102, 104, 200, and 300 in FIGS. 1 to 4) according to an embodiment of the disclosure.

Referring to FIGS. 8 and 9, ‘I’ indicates the initial position of the coil 403 in a simple assembly state in the Z-axis direction, and ‘N’ indicates a Z-axis direction position with a maximum BL factor. For example, BL factors may be distributed or formed symmetrically with respect to the position indicated by ‘N’ and gradually decrease as the distance from the position indicated by ‘N’ increases. In some embodiments of the disclosure, the position indicated by ‘N’ may be determined substantially by the assembly positions of the magnets 404*a* and 404*b*.

In the graphs of FIGS. 8 and 9, the horizontal axis represents Z-axis direction displacements of the coil 403 or the diaphragm 401 from the initial position I of the coil 403, and an arrow in a direction to ‘IN’ may indicate that the coil 403 or the diaphragm 401 in FIG. 5 moves in the −Z direction from the initial position, and an arrow in a direction to ‘OUT’ may indicate that the coil 403 or the diaphragm 401 moves in the +Z direction. In the graphs of FIGS. 8 and 9, the vertical axis represents BL factors of the speaker 400, and a BL factor may be defined as the integral value of the magnetic flux density B of a magnetic field generated by the magnets 404*a* and 404*b* and the length l (see FIG. 5) of the coil 403.

A speaker having the BL factor characteristics of FIGS. 8 and 9 (e.g., the speaker 400 in FIG. 5) may have a thickness of about 2 mm to 4 mm, and a specified gap (e.g., several hundred um) may be secured between a coil and a yoke (e.g., the coil 403 and the first yoke 402*a* in FIG. 5) based on the maximum amplitude of the diaphragm 401. The general speaker having the BL factor characteristics of FIG. 8 may not include the afore-described avoidance groove 421 and height adjuster 411, and may have a certain offset between the position N with the maximum BL factor and the initial position I of the coil. The speaker 400 having the BL factor characteristics of FIG. 9 may have the first yoke 402*a* having a thickness of about several hundreds of um and the avoidance groove 421 formed to a depth of about several tens of um, and the BL factor may increase to a value corresponding to the depth of the avoidance groove 421. In another embodiment of the disclosure, the speaker 400 may reduce the offset between the initial position I of the coil 403 and the position N at which the BL factor is maximized or may make the initial position I and the position N substantially coincident, by using the height adjuster 411. For example, the depth of the avoidance groove 421, the length of the height adjuster 411, and/or the height of a bent or curved portion (e.g., the depth of the bent groove 413) may be appropriately selected based on the BL factor or the offset to substantially match the initial position I to the position N. In another embodiment of the disclosure, the depth or shape of the avoidance groove 421 may be appropriately selected based on the rigidity and magnetic flux leakage of a yoke (e.g., the first yoke 402*a*). For example, the avoidance groove 421 having a depth of about 0.03 mm or more may be formed in a structure having a thickness of about 2 mm to 4 mm in which a gap, which is specified based on a space for the maximum amplitude of the diaphragm 401, is secured between the coil and the yoke (e.g., the coil 403 and the first yoke 402*a* in FIG. 5) as described before. According to various embodiments of the disclosure, since this avoidance groove 421 or height adjuster 411 is disposed, the speaker 400 may have the BL factor characteristics as illustrated in FIG. 9.

According to various embodiments of the disclosure, when the same electrical signal is applied to the coil 403, the BL factor may change according to the displacement (e.g., −Z direction or a +Z direction displacement) of the coil 403 from the initial position I. In general, in a structure in which the initial position I of the coil 403 coincides with the position N, BL factors versus displacements of the coil 403 or the diaphragm 401 may be symmetrical with respect to the initial position of the magnets 404*a* and 404*b*, for example, the position N with the maximum BL factor. For example, in the structure in which the initial position I of the coil 403 coincides with the position N, the BL factor may decrease as the position of the coil 403 is farther away from the initial position I, regardless of a displacement direction.

Referring to FIG. 8, it may be noted that when there is an offset between the initial position I of the coil 403 and the position N, BL factors versus displacements of the coil 403 are asymmetrical with respect to the initial position I of the coil 403. For example, it may be noted that while the coil 403 moves in the −Z direction, the BL factor gradually increases and gradually decreases from the position N, and while the coil 403 moves in the +Z direction, the BL factor continuously decreases. In the illustrated embodiment of the disclosure, a BL factor at a position where the coil 403 has moved approximately −0.2 mm from the initial position I is different from a BL factor at a position where the coil 403 has moved approximately +0.2 mm from the initial position I by approximately 0.04N/A, and this asymmetry of BL factors may be proportional to the displacement of the coil 403 from the initial position I. The asymmetry of BL factors with respect to the initial position I of the coil 403 or according to the displacement of the coil 403 may be improved by reducing the offset between the initial position I of the coil 403 and the position N. However, since a gap should be secured based on the amplitude of the coil 403 or the diaphragm 401 or the deformation of the suspension 406, there may be limitations in reducing the deviation or offset between the initial position I and the position N in a typical speaker.

According to various embodiments of the disclosure, as far as the thickness of the first yoke 402*a* permits, the avoidance groove 341 may be formed to a certain depth (e.g., about 0.03 mm or more) or the length of the height adjuster 411 may be adjusted, to reduce the offset between the initial position I and the position N, while an available space is secured based on the amplitude of the diaphragm 401. For example, the diaphragm 401 and/or the coil 403 may be disposed closer to the first yoke 402*a*, while the height or thickness of the bent portion 461 of the suspension 406 is reduced, or the coil 403 may be disposed closer to the first yoke 402*a* by means of the height adjuster 411, while the shape of the suspension 406 or the position of the diaphragm 401 is kept unchanged, in the speaker 400 according to various embodiments of the disclosure. For example, as the speaker 400 includes the avoidance groove 421, an available space or gap may be provided between the coil 403 and the first yoke 402*a* (e.g., the bottom surface of the avoidance groove 421) based on the maximum amplitude of the diaphragm 401 and the vibration of the diaphragm 401, and the coil 403 may be arranged or assembled at the position with the maximum BL factor, while this available gap is maintained.

Referring to FIG. 9, it may be noted that the initial position I and the position N substantially coincide with each other, and the BL factor distribution is symmetrical with respect to the initial position I according to the displacement of the coil 403 in the speaker 400 including the avoidance groove 421. In the speaker 400 according to various embodiments of the disclosure, when the coil 403 and/or the diaphragm 401 vibrates or linearly reciprocates approximately between a −0.4 mm position and a +0.4 mm position, the BL factor of the speaker 400 may be maintained to be about 0.6N/A or more. On the other hand, it may be noted from in FIG. 8 that the BL factors according to the displacements of the coil in the IN direction and the OUT direction are asymmetrical with respect to the initial position I of the coil, and the BL factor decreases to approximately 0.54N/A at a +0.4 mm position. While it has been described herein that "the BL factor distribution is symmetrical with respect to the initial position I", various embodiments are not limited thereto. For example, various embodiments of the disclosure may improve the asymmetry of the BL factor distribution by adjusting the position of the coil 403, and "a configuration in which the BL factor distribution is symmetrical with respect to the initial position I" may correspond to one of these various embodiments.

As such, the position of the coil 403 may be easily adjusted in correspondence with the depth of the avoidance groove 421, and the symmetry and/or linearity of BL factors according to displacements of the coil 403 may be secured, while a larger BL factor is achieved by the position adjustment of the coil 403, in the speaker 400 and/or the electronic device 300 according to various embodiments of the disclosure. For example, the speaker 400 and/or the electronic device 300 according to various embodiments of the disclosure may provide an improved sound quality and/or a rich sound volume through easy sound quality adjustment. In some embodiments of the disclosure, the gap between the diaphragm 401 and a yoke (e.g., the first yoke 402*a*) may be easily reduced in correspondence with the depth of the avoidance groove 421, thereby reducing the thickness of the speaker 400 and/or the electronic device 300 according to various embodiments of the disclosure. In a structure in which it is difficult to change the shape of the suspension 406 or to reduce the gap between the diaphragm 401 and the yoke (e.g., the first yoke 402*a*) for securing a gap between the suspension 406 or another structure (e.g., the second yoke 402*b* and/or the second magnets 404*b* in FIG. 5), the initial position I of the coil 403 may be easily aligned with the position N (e.g., the position with the maximum BL factor) by using the height adjuster 411.

Now, a description will be given of various modification examples of the speaker (e.g., the speaker 321*a* in FIG. 4 or the speaker 400 in FIG. 5) with reference to FIGS. 10 to 13. In the following description of embodiments of the disclosure, the same reference numerals or no reference numerals may be assigned to components which may be readily understood from the foregoing embodiments of the disclosure, and their detailed description may also be avoided.

Figure 10:
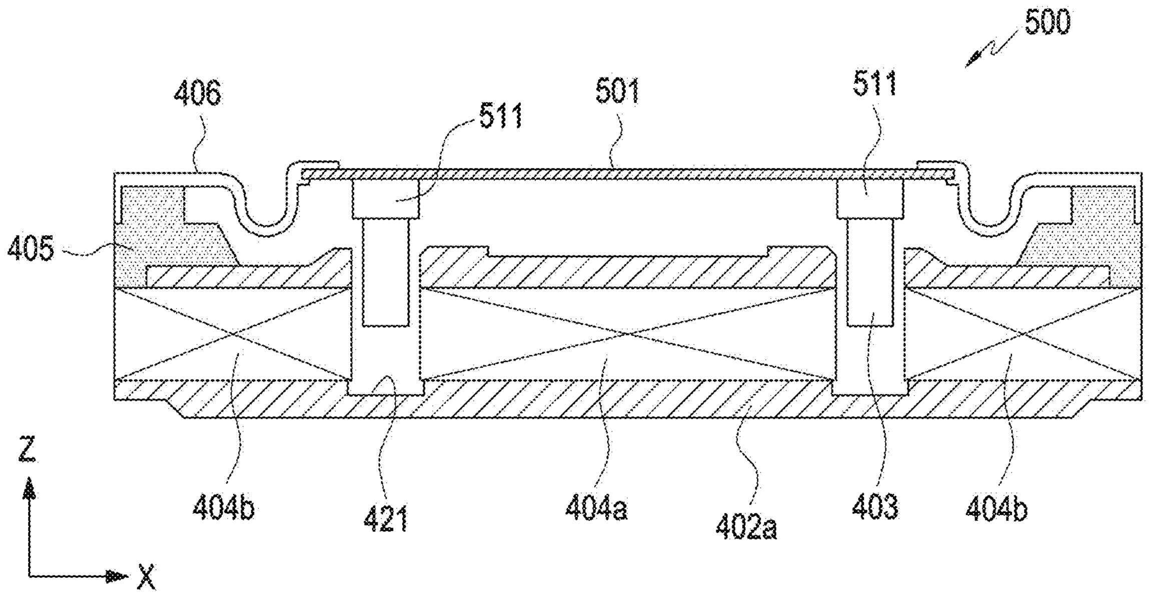
FIG. 10 is a sectional view illustrating a configuration of a speaker in an electronic device according to an embodiment of the disclosure.

FIG. 10 is a sectional view illustrating a speaker 500 of an electronic device (e.g., the electronic devices 101, 102, 104, 200, and 300 in FIGS. 1 to 4) according to an embodiment of the disclosure.

Referring to FIG. 10, the speaker 500 and/or a diaphragm 501 may further include a height adjustment member 511. For example, the height adjustment member 511 may be attached to one surface of the diaphragm 501 to substitute for the height adjuster 411 of FIG. 5, and the coil 403 may be mounted to the height adjustment member 511 and disposed on the one surface of the diaphragm 501. In the structure including the height adjustment member 511, the height adjuster 411 and/or the bent groove 413 of FIG. 5 may be omitted. For example, the diaphragm 501 may be shaped into a substantially flat plate. In another embodiment of the disclosure, to increase the bonding force between the height adjustment member 511 and the one surface of the diaphragm 501, a concave-convex structure may be formed on the bonding surface between the one surface of the diaphragm 501 and the height adjustment member 511.

Figure 11:
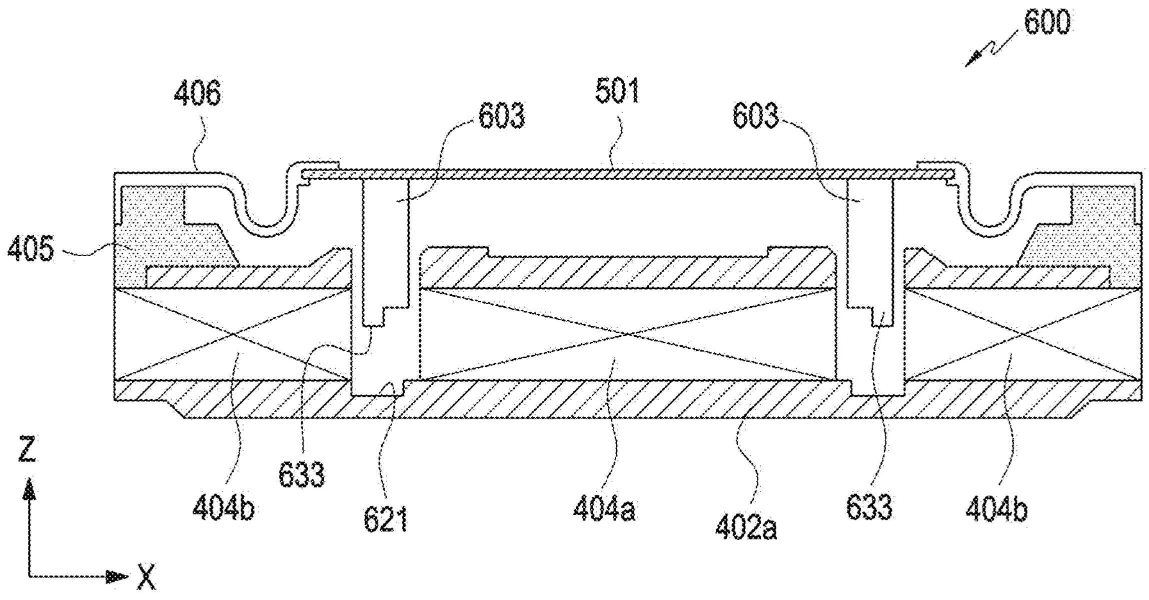
FIG. 11 is a sectional view illustrating a configuration of a speaker in an electronic device according to an embodiment of the disclosure.

FIG. 11 is a sectional view illustrating a speaker 600 in an electronic device (e.g., the electronic devices 101, 102, 104, 200, and 300 in FIGS. 1 to 4) according to an embodiment of the disclosure.

Referring to FIG. 11, in the speaker 600, an end 633 of a coil 603 (e.g., the surface 431 facing the first yoke 402*a* in FIG. 5) may be stepped in shape, and an avoidance groove 621 (e.g., the avoidance groove 421 in FIG. 5) may be formed into a shape corresponding to the shape of the end 633 of the coil 603. For example, the height adjuster 411 in FIG. 5 or the height adjustment member 511 of FIG. 10 may be omitted. In this case, compared to the coil 403 in FIG. 5, the coil 603 of FIG. 11 may include a protrusion (e.g., the stepped end 633) of a size or length corresponding to the avoidance groove 621, so that the initial position of the coil 603 may be aligned with the magnets 404*a* and 404*b*.

Figure 12:
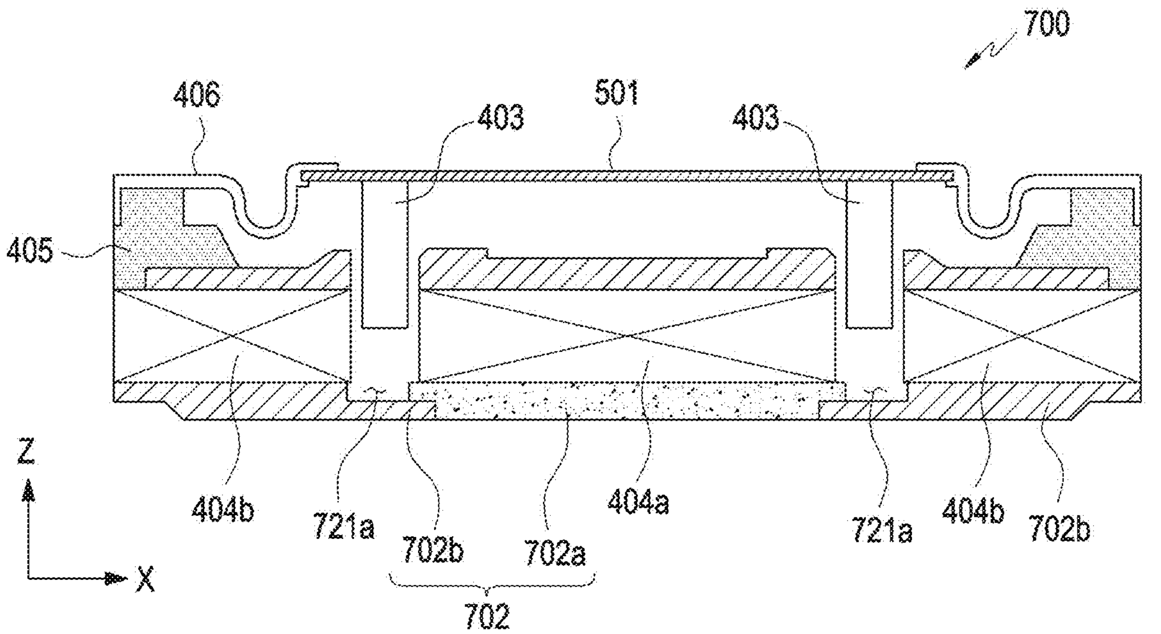
FIG. 12 is a sectional view illustrating a configuration of a speaker in an electronic device according to an embodiment of the disclosure.
Figure 13:
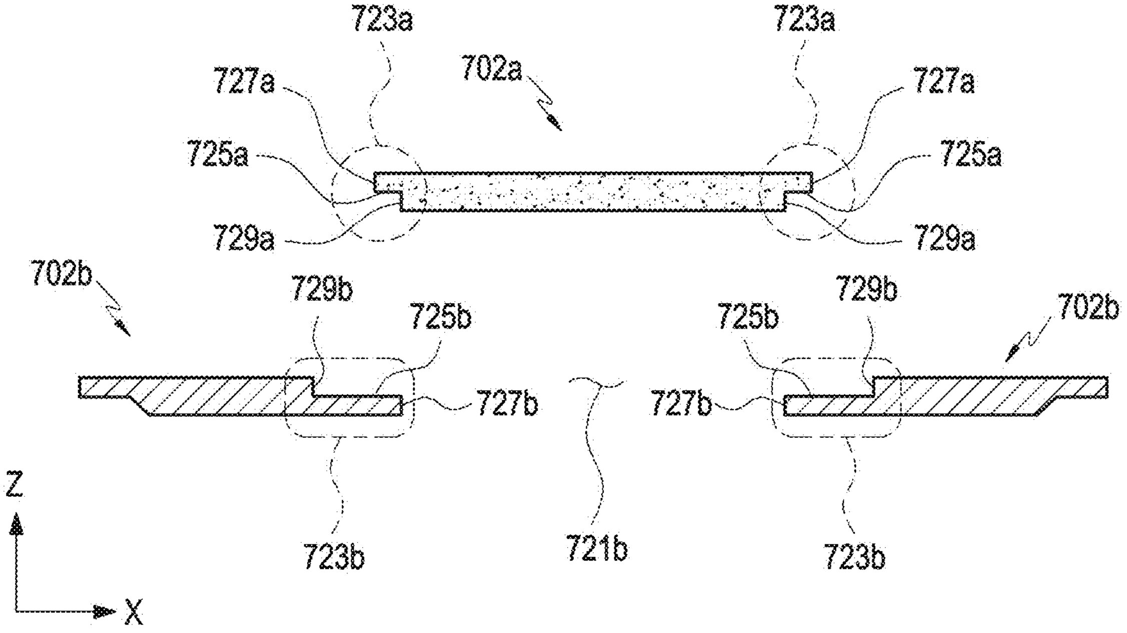
FIG. 13 is a sectional view illustrating a yoke separated from a speaker illustrated in FIG. 12 according to an embodiment of the disclosure.

FIG. 12 is a sectional view illustrating a speaker 700 in an electronic device (e.g., the electronic devices 101, 102, 104, 200, and 300 in FIGS. 1 to 4) according to an embodiment of the disclosure. FIG. 13 is a sectional view illustrating a yoke 702 (e.g., the first yoke 402*a* in FIG. 5) separated from the speaker 700 of FIG. 12 according to an embodiment of the disclosure.

In the embodiment of the disclosure, the yoke 702 (e.g., the first yoke 402*a* in FIG. 5) may be manufactured in a manner, such as die casting, press working, and/or computer numerical control machining. In another embodiment of the disclosure, the yoke 702 may be manufactured by combining a plurality of yoke plates 702*a* and 702*b*, and an avoidance groove 721*a* may be formed substantially by combining the yoke plates 702*a* and 702*b*.

Referring to FIGS. 12 and 13, the yoke 702 may be formed by combining the plurality of yoke plates 702*a* and 702*b* in the speaker 700. In an embodiment of the disclosure, a first yoke plate 702*a* among the yoke plates may include a first stepped portion 723*a* formed along an edge thereof. The first stepped portion 723*a* may include a first bottom surface 725*a* facing in the −Z direction and a first sidewall 729*a* disposed outward in the X-axis direction. In some embodiments of the disclosure, the first bottom surface 725*a* may couple the first sidewall 729*a* to a side surface 727*a* of the first yoke plate 702*a*. Among the yoke plates, a second yoke plate 702*b* may include a second stepped portion 723*b* which is formed around an opening area 721*b*, while forming the opening area 721*b*. The second stepped portion 723*b* may include a second bottom surface 725*b* facing in the +Z direction and a second sidewall 729*b* disposed facing inward or the opening area 721*b* in the X-axis direction. In some embodiments of the disclosure, the second bottom surface 725*b* may couple the second sidewall 729*b* to a side surface 727*b* of the second yoke plate 702*b* (e.g., a side surface defining the perimeter of the opening area 721*b*).

According to various embodiments of the disclosure, the opening area 721*b* may at least partially accommodate the first yoke plate 702*a*. For example, the first yoke plate 702*a* may be coupled to the second yoke plate 702*b*, while being disposed in the opening area 721*b*. According to an embodiment of the disclosure, when the first yoke plate 702*a* is disposed in the opening area 721*b*, the first bottom surface 725*a* may be bonded to the second bottom surface 725*b* to face each other. For example, as the bottom surfaces 725*a* and 725*b* are bonded to face each other, the first yoke plate 702*a* and the second yoke plate 702*b* may be coupled with each other, and thus the yoke 702 (e.g., the first yoke 402*a* in FIG. 5) may be fabricated. A method, such as welding, thermal fusion, thermal or electrically conductive adhesive-based attachment, or soldering may be used in bonding the bottom surfaces 725*a* and 725*b* to each other.

According to various embodiments of the disclosure, in the yoke 702 manufactured by combining a plurality of yoke plates (e.g., the first yoke plate 702*a* and the second yoke plate 702*b*), the first sidewall 729*a* may be disposed substantially in contact with the side surface 727*b* of the second yoke plate 702*b* (e.g., a surface defining part of the opening area 721*b*). The avoidance groove 721*a* may be partially surrounded by at least one of the second sidewall 729*b* of the second yoke plate 702*b*, the second bottom surface 725*b* of the second yoke plate 702*b*, and/or the side surface 727*a* of the first yoke plate 702*a*. In some embodiments of the disclosure, the side surface 727*a* of the first yoke plate 702*a* may be disposed to face the second sidewall 729*b*, so that the side surface 727*a* together with the second side wall 729*b* forms an inner wall of the avoidance groove 721*a*, and part of the bottom surface 725*b* forms substantially the bottom surface of the avoidance groove 721*a*.

Figure 14:
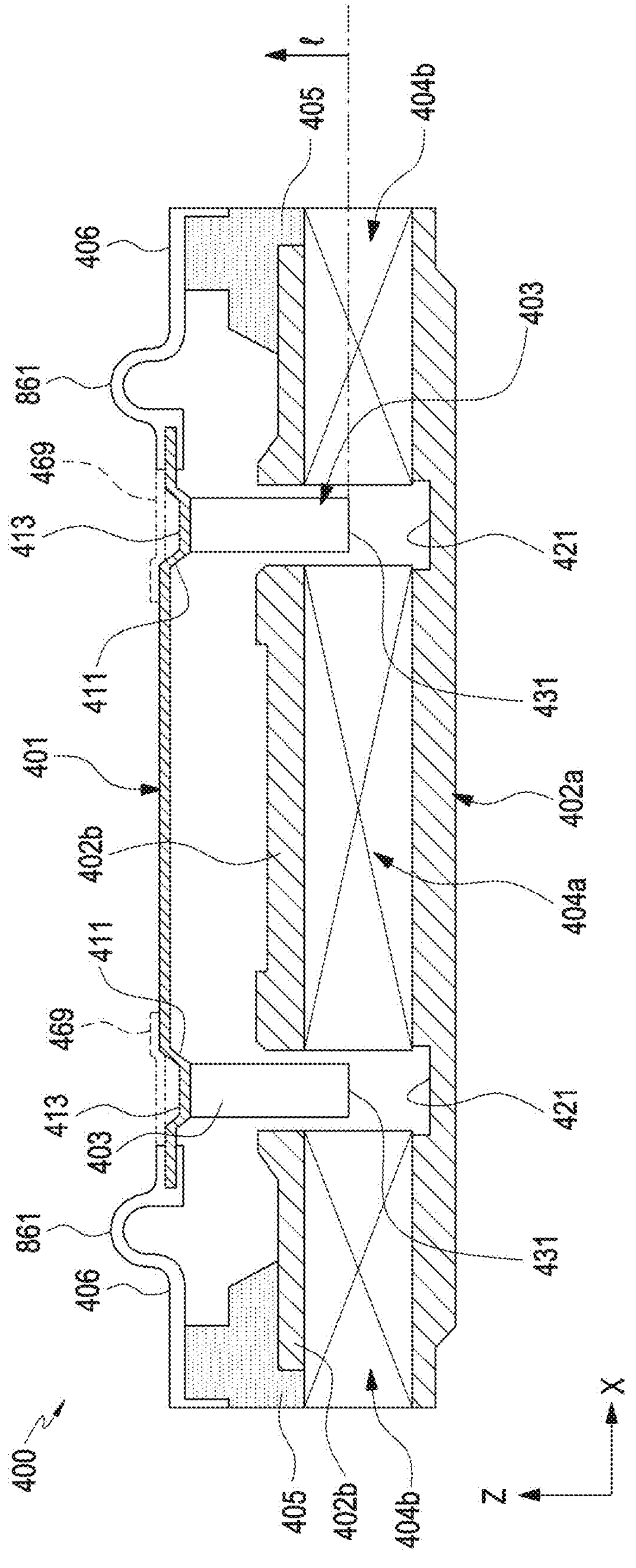
FIG. 14 is a sectional view illustrating a configuration of a speaker in an electronic device according to an embodiment of the disclosure.

FIG. 14 is a sectional view illustrating a speaker 400 in an electronic device (e.g., the electronic devices 101, 102, 104, 200, and 300 in FIGS. 1 to 4) according to an embodiment of the disclosure.

In the embodiment of the disclosure, bent portion(s) (e.g., the bent portion 461 in FIG. 5) of a suspension is disposed more inward than the diaphragm 401, by way of example. However, various embodiments of the disclosure are limited thereto.

Referring to FIG. 14, the suspension 406 may include a bent portion 861 protruding more outward than the diaphragm 401. For example, various shapes, such as 'U', upside down 'U', 'S', or zigzag (e.g., a partially corrugated shape) are available for the suspension 406 or the bent portions 461 and 861, not limiting various embodiments of the disclosure. Other components of the speaker 400 in FIG. 14 may be similar to those of the foregoing embodiments or combinations of selective components of the foregoing embodiments of the disclosure, which will not be described herein.

Figure 15:
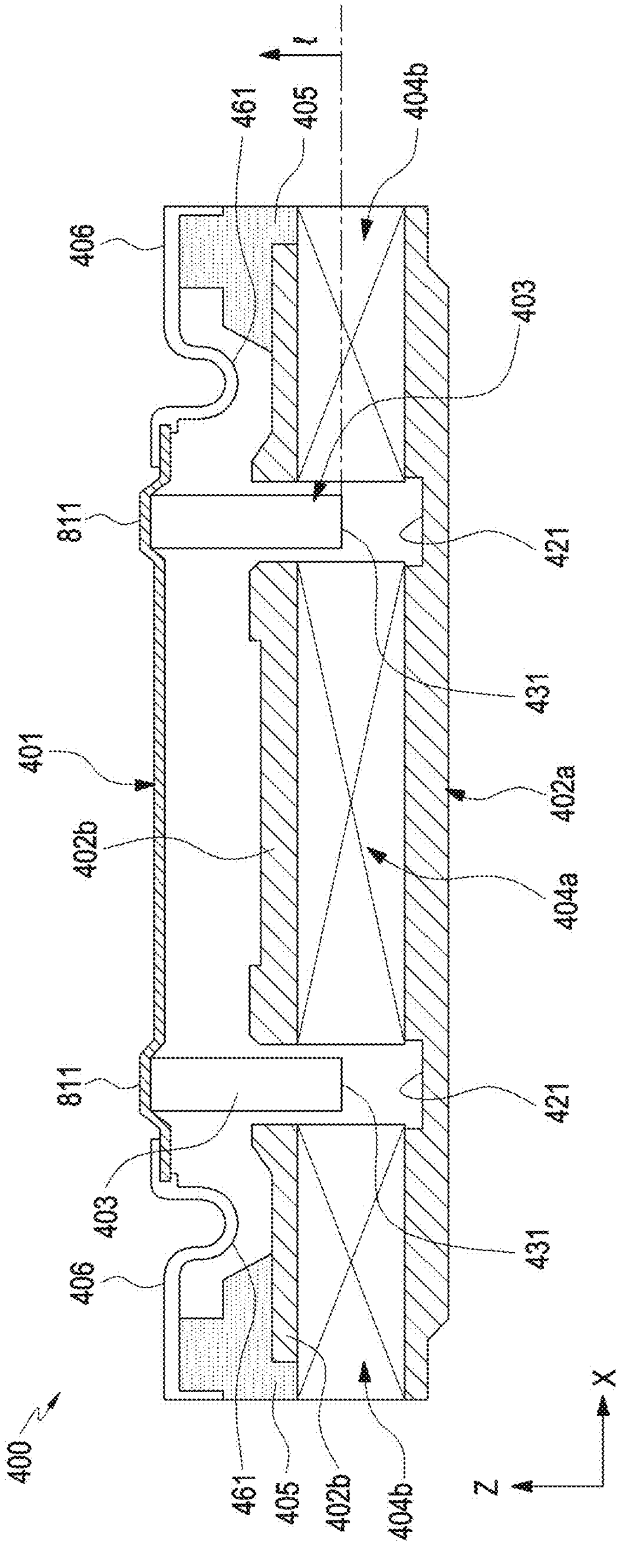
FIG. 15 is a sectional view illustrating a configuration of a speaker in an electronic device according to an embodiment of the disclosure.

FIG. 15 is sectional view illustrating a speaker 400 in an electronic device (e.g., the electronic devices 101, 102, 104, 200, and 300 in FIGS. 1 to 4) according to an embodiment of the disclosure.

In the embodiment of the disclosure, while a height adjuster (e.g., the height adjuster 411 in FIG. 5) of the diaphragm 401 protrudes in the −Z direction on the diaphragm 401, by way of example, various implementations of the disclosure are not limited thereto.

Referring to FIG. 15, a height adjuster 811 may protrude in the +Z direction on the diaphragm 401, and the coil 403 may be disposed on an inner surface of the diaphragm 401 (e.g., a surface facing the −Z direction) in correspondence with the height adjuster 811. Other components of the speaker 400 in FIG. 15 may be similar to those of the foregoing embodiments or combinations of selective components of the foregoing embodiments of the disclosure, which will not be described herein.

As described above, according to various embodiments of the disclosure, a speaker (e.g., the sound output module 155 in FIG. 1, the speaker 321*a* in FIG. 4, or the speaker 400 in FIG. 5) and/or an electronic device including the same (e.g., the electronic devices 101, 102, 104, 200, and 300 in FIGS. 1 to 4) may include a diaphragm (e.g., the diaphragm 401 in FIG. 5), a yoke (e.g., the first yoke 402*a* in FIGS. 5 to 7) disposed to face the diaphragm and including an avoidance groove (e.g., the avoidance groove 421 in FIGS. 5 to 7) formed on a surface thereof facing the diaphragm, a coil (e.g., the coil 403 in FIGS. 5 to 7) mounted to one surface of the diaphragm and disposed between the diaphragm and the yoke, and a first magnet (e.g., the first magnet 404*a* in FIGS. 5 to 7) mounted to the yoke and disposed to be surrounded by at least part of the coil or a second magnet (e.g., the second magnets 404*b* in FIGS. 5 to 7) disposed to surround at least part of the coil. The coil may be disposed to make a surface thereof facing the yoke correspond to the avoidance groove and configured to linearly reciprocate the diaphragm by receiving an electric signal.

According to various embodiments of the disclosure, the diaphragm may include a height adjuster (e.g., the height adjuster 411 in FIG. 5) protruding on the one surface thereof, and the coil may be mounted to the height adjuster.

According to various embodiments of the disclosure, the diaphragm may further include a bent groove (e.g., the bent groove 413 in FIG. 5) sunken on the other surface thereof at a position corresponding to the height adjuster.

According to various embodiments of the disclosure, the diaphragm may include a height adjustment member (e.g., the height adjustment member 511 in FIG. 10) attached to the one surface thereof, and the coil may be mounted to the height adjustment member.

According to various embodiments of the disclosure, the yoke (e.g., the first yoke 402*a* in FIG. 5 or the yoke 702 in FIG. 12) may include a first yoke plate (e.g., the first yoke plate 702*a* in FIG. 12 or FIG. 13) including a first stepped portion (e.g., the first step portion 723*a* in FIG. 13) formed along an edge thereof, and a second yoke plate (e.g., the second yoke plate 702*b* in FIG. 12 or FIG. 13) forming an opening area (e.g., the opening area 721*b* in FIG. 13) accommodating the first yoke plate at least partially and including a second stepped portion (e.g., the second stepped portion 723*b* in FIG. 13) formed around the opening area, and a bottom surface (e.g., the first bottom surface 725*a* in FIG. 13) of the first stepped portion may be bonded to a bottom surface (e.g., the second bottom surface 725*b* in FIG. 13) of the second stepped portion.

According to various embodiments of the disclosure, the avoidance groove may be surrounded at least partially by at least one of a sidewall (e.g., the second sidewall 729*b* in FIG. 13) of the second stepped portion, the bottom surface of the second stepped portion, or a side surface (e.g., the side surface indicated by reference numeral '723*a*' in FIG. 13) of the first yoke plate.

According to various embodiments of the disclosure, the coil may have a first width (e.g., the first width d1 in FIG. 6) on the surface thereof facing the yoke, and the avoidance groove may have a second width (e.g., the second width d2 in FIG. 6) larger than the first width.

According to various embodiments of the disclosure, the speaker and/or the electronic device may further include a frame (e.g., the frame 405 in FIG. 5) disposed on the yoke, and a suspension (e.g., the suspension 406 in FIG. 5) disposed around the diaphragm and coupling the diaphragm to the frame, and at least part of an edge of the diaphragm may be coupled with the suspension.

According to various embodiments of the disclosure, the diaphragm may further include a height adjuster protruding on the one surface of the diaphragm, and a bent groove sunken on the other surface of the diaphragm at a position corresponding to the height adjuster, and the coil may be mounted to the height adjuster.

According to various embodiments of the disclosure, the speaker and/or the electronic device including the same may further include a filler (e.g., the filler 499 in FIG. 5) disposed in the bent groove, and the suspension may be disposed to seal the bent groove.

According to various embodiments of the disclosure, the suspension may include a bent portion (e.g., the bent portion 461 in FIG. 5) protruding toward the yoke.

According to various embodiments of the disclosure, a speaker (e.g., the speaker 321*a* in FIG. 4 or the speaker 400 in FIG. 5) and/or an electronic device (e.g., the electronic devices 101, 102, 104, 200, and 300 in FIGS. 1 to 4) including the same may include a diaphragm (e.g., the diaphragm 401 in FIG. 5) including a height adjuster (e.g., the height adjuster 411 in FIG. 5) protruding on one surface thereof and a bent groove (e.g., the bent groove 412 in FIG. 5) sunken on the other surface thereof at a position corresponding to the height adjuster, a yoke (e.g., the first yoke 402*a* in FIGS. 5 to 7) disposed to face the diaphragm and including an avoidance groove (e.g., the avoidance groove 421 in FIGS. 5 to 7) formed on a surface thereof facing the diaphragm, a coil (e.g., the coil 403 in FIGS. 5 to 7) mounted to the height adjuster on the one surface of the diaphragm and disposed between the diaphragm and the yoke, and a first magnet (e.g., the first magnet 404*a* in FIGS. 5 to 7) mounted to the yoke and disposed to be surrounded by at least part of the coil or a second magnet (e.g., the second magnets 404*b* in FIGS. 5 to 7) disposed to surround at least part of the coil. The coil may have a smaller width (e.g., the first width d1 in FIG. 6) on a surface thereof facing the yoke (e.g., the surface indicated by reference numeral '431' in FIG. 5 or FIG. 6) than the avoidance groove, may be disposed to make the surface thereof facing the yoke correspond to the avoidance groove, and may be configured to linearly reciprocate the diaphragm by receiving an electric signal.

According to various embodiments of the disclosure, the speaker and/or the electronic device including the same may further include a frame (e.g., the frame 405 in FIG. 5) disposed on the yoke, and a suspension (e.g., the suspension 406 in FIG. 5) disposed around the diaphragm and coupling the diaphragm to the frame, and at least part of an edge of the diaphragm may be coupled with the suspension.

According to various embodiments of the disclosure, the speaker and/or the electronic device including the same may further include a filler (e.g., the filler 499 in FIG. 5) disposed in the bent groove, and the suspension may be disposed to cover at least part of the bent groove.

According to various embodiments of the disclosure, an electronic device (e.g., the electronic devices 101, 102, 104, 200, and 300 in FIGS. 1 to 4) may include a housing (e.g., the housing 210 in FIG. 3) including a first surface (e.g., the first surface 210A in FIG. 2), a second surface (e.g., the second surface 210B in FIG. 3) facing in an opposite direction to the first surface, and a side surface (e.g., the side surface 210C in FIG. 2) at least partially surrounding a space between the first surface and the second surface, and at least one speaker (e.g., the speaker 321*a* in FIG. 4 or the speaker 400 in FIG. 5) disposed inside the housing between the first surface and the second surface. The speaker may include a diaphragm (e.g., the diaphragm 401 in FIG. 5), a yoke (e.g., the first yoke 402*a* in FIGS. 5 to 7) disposed to face the diaphragm and including an avoidance groove (e.g., the avoidance groove 421 in FIGS. 5 to 7) formed on a surface thereof facing the diaphragm, a coil (e.g., the coil 403 in FIGS. 5 to 7) mounted to one surface of the diaphragm and disposed between the diaphragm and the yoke, and a first magnet (e.g., the first magnet 404*a* in FIGS. 5 to 7) mounted to the yoke and disposed to be surrounded by at least part of the coil or a second magnet (e.g., the second magnet 404*b* in FIGS. 5 to 7) disposed to surround at least part of the coil, and the coil may have a smaller width (e.g., the first width d1 in FIG. 6) on a surface thereof facing the yoke than the avoidance groove, may be disposed to make the surface thereof facing the yoke correspond to the avoidance groove, and may be configured to linearly reciprocate the diaphragm by receiving an electric signal.

According to various embodiments of the disclosure, the diaphragm may include a height adjuster (e.g., the height adjuster 411 in FIG. 5) protruding on the one surface of the diaphragm, and a bent groove (e.g., the bent groove 413 in FIG. 5) sunken on the other surface of the diaphragm at a position corresponding to the height adjuster, and the coil may be mounted to the height adjuster.

According to various embodiments of the disclosure, the speaker may further include a frame (e.g., the frame 405 in FIG. 5) disposed on the yoke, and a suspension (e.g., the suspension 406 in FIG. 5) disposed around the diaphragm and coupling the diaphragm to the frame, and at least part of an edge of the diaphragm may be coupled with the suspension.

According to various embodiments of the disclosure, the speaker may further include a filler (e.g., the filler 499 in FIG. 5) disposed in the bent groove, and the suspension may be disposed to seal the bent groove.

According to various embodiments of the disclosure, the suspension may include a bent portion (e.g., the bent portion 461 in FIG. 5) protruding toward the yoke.

According to various embodiments of the disclosure, the electronic device may further include at least one sound hole (e.g., the audio modules 214 and 203 in FIG. 2) formed to radiate a sound in a direction in which the first surface faces or in a direction in which the side surface faces, and the speaker may output a sound to the outside of the housing through the sound hole.

While the disclosure has been shown and described with reference to various embodiments thereof, it will be understood by those skilled in the art that various changes in form and details may be made therein without departing from the spirit and scope of the disclosure as defined by the appended claims and their equivalents. For example, the above-described different embodiments may be combined to constitute an additional embodiment. In an embodiment of the disclosure, the height adjuster of FIG. 5 or the height adjustment member of FIG. 10 may be combined with the coil shape of FIG. 11 or the yoke structure of FIG. 12, and the yoke structure of FIG. 12 may be combined with the coil shape of FIG. 11. In some embodiments of the disclosure, one electronic device may include a plurality of speakers, and the audio modules 214 and 203 described before with reference to FIG. 2 or FIG. 3 may be interpreted as including the above speaker.

What is claimed is:

1. A speaker comprising:

a diaphragm including a height adjuster protruding on one surface of the diaphragm, and a bent groove sunken into another surface of the diaphragm at a position corresponding to the height adjuster;

a yoke disposed to face the diaphragm and including an avoidance groove formed on a surface thereof facing the diaphragm;

a coil mounted in the bent groove corresponding to the height adjuster such that the coil is disposed to one surface of the diaphragm and disposed between the height adjuster of the diaphragm and the avoidance groove of the yoke; and a first magnet mounted to the yoke and disposed to be surrounded by at least part of the coil or a second magnet disposed to surround at least part of the coil, wherein the coil is disposed to make a surface thereof facing the yoke correspond to the avoidance groove, and wherein the coil is configured to linearly reciprocate the diaphragm by receiving an electric signal.

2. The speaker of claim 1, wherein the diaphragm comprises a height adjustment member attached to the one surface thereof, and wherein the coil is mounted to the height adjustment member.

3. The speaker of claim 1, wherein the yoke comprises:

a first yoke late including a first stepped portion formed along an edge thereof, and a second yoke late forming an opening area accommodating the first yoke plate at least partially and including a second stepped portion formed around the opening area, and wherein a bottom surface of the first stepped portion is bonded to a bottom surface of the second stepped portion.

4. The speaker of claim 3, wherein the avoidance groove is surrounded at least partially by at least one of a sidewall of the second stepped portion, the bottom surface of the second stepped portion, or a side surface of the first yoke plate.

5. The speaker of claim 1,
wherein the coil has a first width on the surface thereof facing the yoke, and
wherein the avoidance groove has a second width larger than the first width.

6. The speaker of claim 1, further comprising:
a frame disposed on the yoke; and
a suspension disposed around the diaphragm and coupling the diaphragm to the frame,
wherein at least part of an edge of the diaphragm is coupled with the suspension.

7. The speaker of claim 1, further comprising:
a filler disposed in the bent groove,
wherein the suspension is disposed to seal the bent groove.

8. The speaker of claim 6, wherein the suspension comprises a bent portion protruding toward the yoke.

9. The speaker of claim 1, wherein the coil has a smaller width on the surface thereof facing the yoke than the avoidance groove.

10. An electronic device comprising:
a housing including a first surface, a second surface facing in an opposite direction to the first surface, and a side surface at least partially surrounding a space between the first surface and the second surface; and
at least one speaker disposed inside the housing between the first surface and the second surface,
wherein the speaker comprises:
a diaphragm including a height adjuster protruding on one surface of the diaphragm, and a bent groove sunken into another surface of the diaphragm at a position corresponding to the height adjuster,
a yoke disposed to face the diaphragm and including an avoidance groove formed on a surface thereof facing the diaphragm,
a coil mounted in the bent groove corresponding to the height adjuster such that the coil is disposed to one surface of the diaphragm and disposed between the height adjuster of the diaphragm and the avoidance groove of the yoke, and
a first magnet mounted to the yoke and disposed to be surrounded by at least part of the coil or a second magnet disposed to surround at least part of the coil,
wherein the coil has a smaller width on a surface thereof facing the yoke than the avoidance groove,
wherein the coil is disposed to make the surface thereof facing the yoke correspond to the avoidance groove, and
wherein the coil is configured to linearly reciprocate the diaphragm by receiving an electric signal.

11. The electronic device of claim 10, further comprising:
at least one sound hole formed to radiate a sound in a direction in which the first surface faces or in a direction in which the side surface faces,
wherein the speaker outputs a sound to an outside of the housing through the sound hole.

12. The electronic device of claim 11,
wherein the yoke comprises:
a first yoke late including a first stepped portion formed along an edge thereof, and
a second yoke plate forming an opening area accommodating the first yoke plate at least partially and including a second stepped portion formed around the opening area, and
wherein a bottom surface of the first stepped portion is bonded to a bottom surface of the second stepped portion.

13. The electronic device of claim 12, wherein the avoidance groove is surrounded at least partially by at least one of a sidewall of the second stepped portion, the bottom surface of the second stepped portion, or a side surface of the first yoke plate.

* * * * *